United States Patent
Min et al.

(10) Patent No.: US 10,319,085 B2
(45) Date of Patent: Jun. 11, 2019

(54) METADATA-BASED IMAGE PROCESSING METHOD AND APPARATUS

(71) Applicant: SAMSUNG ELECTRONICS CO., LTD., Suwon-si (KR)

(72) Inventors: Byung-seok Min, Seoul (KR); Tae-gyu Lim, Seoul (KR); Seung-hoon Han, Seoul (KR); Ho-cheon Wey, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 7 days.

(21) Appl. No.: 15/550,941

(22) PCT Filed: Jan. 28, 2016

(86) PCT No.: PCT/KR2016/000914
§ 371 (c)(1),
(2) Date: Aug. 14, 2017

(87) PCT Pub. No.: WO2016/133293
PCT Pub. Date: Aug. 25, 2016

(65) Prior Publication Data
US 2018/0025477 A1   Jan. 25, 2018

Related U.S. Application Data

(60) Provisional application No. 62/116,649, filed on Feb. 16, 2015.

(51) Int. Cl.
*G06T 5/00* (2006.01)
*H04N 9/64* (2006.01)
(Continued)

(52) U.S. Cl.
CPC ......... *G06T 5/009* (2013.01); *G06T 5/00* (2013.01); *G06T 5/007* (2013.01); *G06T 7/90* (2017.01);
(Continued)

(58) Field of Classification Search
CPC .................. G06T 2320/0666; G06T 5/06
(Continued)

(56) References Cited

U.S. PATENT DOCUMENTS

| 8,731,287 B2 | 5/2014 | Su et al. |
| 8,885,105 B1 | 11/2014 | Cheng et al. |

(Continued)

FOREIGN PATENT DOCUMENTS

| KR | 10-2009-0111939 A | 10/2009 |
| KR | 10-2013-0058034 A | 6/2013 |

(Continued)

OTHER PUBLICATIONS

Search Report dated Jun. 16, 2016, issued by the International Searching Authority in counterpart International Patent Application No. PCT/KR2016/000914 (PCT/ISA/210).
(Continued)

*Primary Examiner* — Thomas J Lett
(74) *Attorney, Agent, or Firm* — Sughrue Mion, PLLC

(57) ABSTRACT

Disclosed are a method and apparatus for generating local metadata including position information of a similar color mapping region and a color mapping function of the similar color mapping region and a method and apparatus for correcting color components 5 of a pixel in a similar color mapping region based on local metadata.

20 Claims, 15 Drawing Sheets

(51) Int. Cl.
| | |
|---|---|
| *H04N 9/68* | (2006.01) |
| *G06T 11/00* | (2006.01) |
| *G09G 5/02* | (2006.01) |
| *G06T 11/60* | (2006.01) |
| *H04N 1/60* | (2006.01) |
| *H04N 9/67* | (2006.01) |
| *H04N 9/82* | (2006.01) |
| *G06T 7/90* | (2017.01) |
| *G06T 7/194* | (2017.01) |

(52) U.S. Cl.
CPC ............ *G06T 11/001* (2013.01); *G06T 11/60* (2013.01); *G09G 5/02* (2013.01); *H04N 1/6027* (2013.01); *H04N 1/6058* (2013.01); *H04N 9/64* (2013.01); *H04N 9/67* (2013.01); *H04N 9/68* (2013.01); *H04N 9/8205* (2013.01); *G06T 7/194* (2017.01); *G06T 2207/10024* (2013.01); *G06T 2207/20208* (2013.01); *G06T 2210/12* (2013.01); *G09G 2320/0271* (2013.01); *G09G 2340/06* (2013.01)

(58) Field of Classification Search
USPC ......................................................... 345/590
See application file for complete search history.

(56) References Cited

U.S. PATENT DOCUMENTS

| | | |
|---|---|---|
| 2013/0114000 A1 | 5/2013 | Atkins |
| 2013/0182776 A1 | 7/2013 | Zhang |
| 2013/0194321 A1 | 8/2013 | Wan et al. |
| 2014/0341305 A1* | 11/2014 | Qu .................... H04N 19/70 375/240.26 |

FOREIGN PATENT DOCUMENTS

| | | |
|---|---|---|
| KR | 10-2013-0107314 A | 10/2013 |
| KR | 10-2013-0139238 A | 12/2013 |
| KR | 10-2014-0120320 A | 10/2014 |

OTHER PUBLICATIONS

Written Opinion dated Jun. 16, 2016, issued by the International Searching Authority in counterpart International Patent Application No. PCT/KR2016/000914 (PCT/ISA/237).

Communication dated Jun. 1, 2018, issued by the Korean Intellectual Property Office in corresponding Korean Application No. 10-2017-7022853.

* cited by examiner

METADATA-BASED IMAGE PROCESSING METHOD AND APPARATUS

TECHNICAL FIELD

A method and apparatus for generating metadata for correcting a dynamic range of an image are disclosed. In addition, a method and apparatus for correcting a dynamic range of an image based on metadata.

BACKGROUND ART

Display apparatuses may have different color representation capabilities, e.g., different color gamuts indicating color reproducible ranges, according to the performance of the display apparatuses.

Therefore, when a color gamut that is a reference for an input image differs from a color gamut of an apparatus for displaying the input image, the color gamut of the input image may be appropriately corrected so as to match the color gamut of the display apparatus, thereby improving color reproduction capability of the display apparatus with respect to the input image.

For example, if a color gamut of an input image is narrower than a color gamut of a display apparatus, it is needed to expand the color gamut of the input image in order to improve color reproduction capability of an image displayed on the display apparatus.

DETAILED DESCRIPTION OF THE INVENTION

Technical Problem

Technical Solution

Disclosed is a metadata generation method including: splitting a first image into a plurality of regions based on spatial proximity and color similarity of pixels included in the first image; acquiring a color mapping function of a first region among the plurality of regions by comparing color information of pixels in the first region with color information of pixels in a second image, which correspond to the pixels in the first region; acquiring a color mapping function of a second region among the plurality of regions by comparing color information of pixels in the second region with color information of pixels in the second image, which correspond to the pixels in the second region; setting the first region and the second region as a similar color mapping region by comparing the color mapping function of the first region with the color mapping function of the second region; acquiring a color mapping function of the similar color mapping region based on the color mapping function of the first region and the color mapping function of the second region; and generating local metadata including position information of the similar color mapping region in the first image and the color mapping function of the similar color mapping region.

Advantageous Effects of the Invention

An input image may be effectively corrected through gamut correction, tone mapping, saturation correction, and region-wise color mapping based on metadata.

BEST MODE

Figure 1:
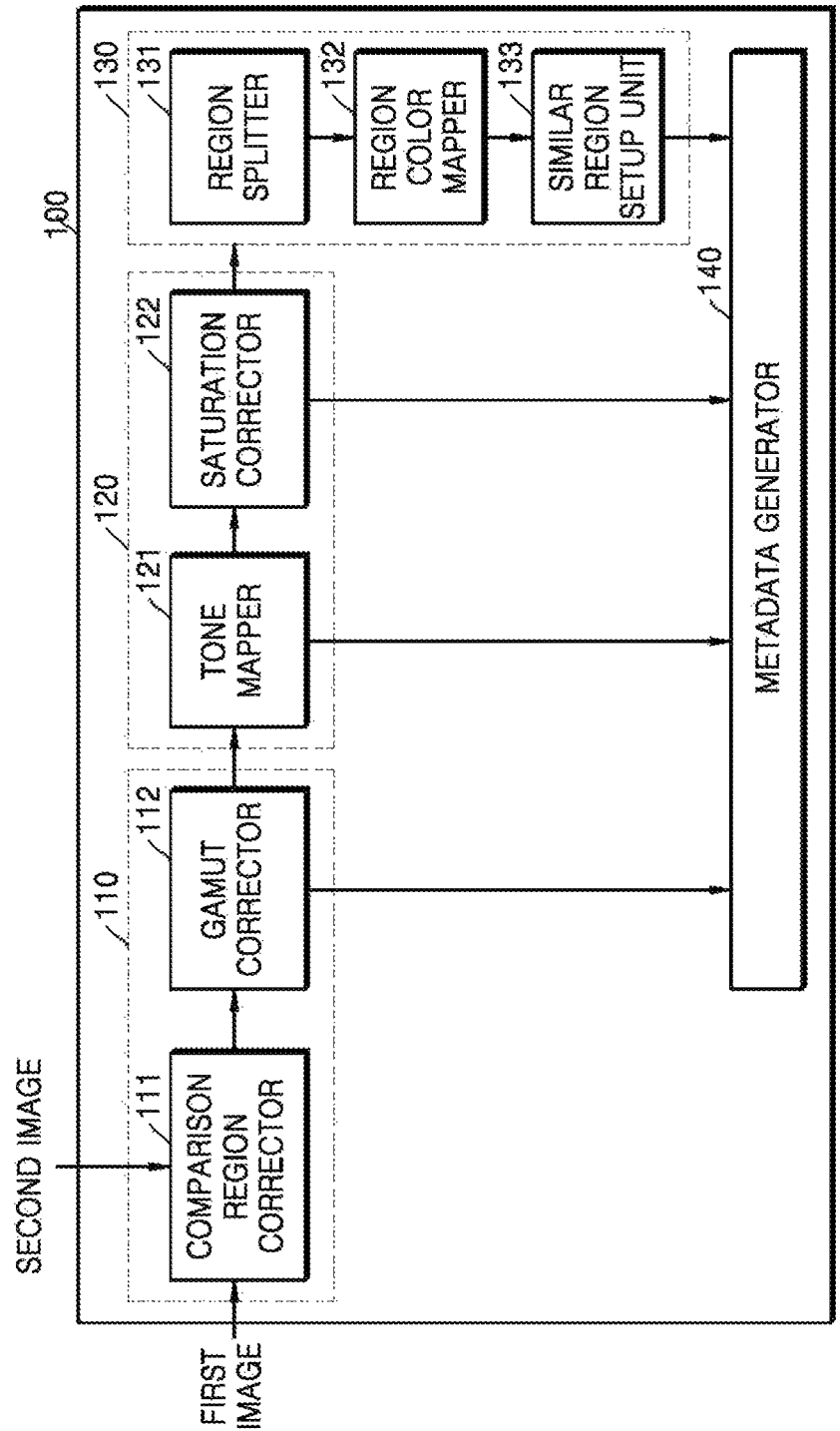
FIG. 1 illustrates a block diagram of a metadata generation apparatus.

Disclosed is a metadata generation method including: splitting a first image into a plurality of regions based on spatial proximity and color similarity of pixels included in the first image; acquiring a color mapping function of a first region among the plurality of regions by comparing color information of pixels in the first region with color information of pixels in a second image, which correspond to the pixels in the first region; acquiring a color mapping function of a second region among the plurality of regions by comparing color information of pixels in the second region with color information of pixels in the second image, which correspond to the pixels in the second region; setting the first region and the second region as a similar color mapping region by comparing the color mapping function of the first region with the color mapping function of the second region; acquiring a color mapping function of the similar color mapping region based on the color mapping function of the first region and the color mapping function of the second region; and generating local metadata including position information of the similar color mapping region in the first image and the color mapping function of the similar color mapping region.

The first image may be split into a foreground region and a background region based on a background model learned in a time axis, and the plurality of regions may be split from the foreground region and the background region.

The first region and the second region may be spatially adjacent.

The metadata generation method may further include: acquiring a color mapping function of a third region, which is adjacent to the second region, among the plurality of regions by comparing color information of pixels in the third region with color information of pixels in the second image, which correspond to the pixels in the third region; and setting the first region through the third region as the similar color mapping region or setting the third region as a new similar color mapping region, by comparing the color mapping function of the similar color mapping region with the color mapping function of the third region.

The position information of the similar color mapping region may include an upper left corner coordinate (x, y) and a right lower corner coordinate (x, y) of at least one bounding box with respect to the similar color mapping region.

The position information of the similar color mapping region may include at least one coordinate (x, y) of a bounding box and size information of the bounding box with respect to the similar color mapping region.

The metadata generation method may further include: generating static metadata including gamut information of the second image; and correcting a color gamut of the first image based on the gamut information of the second image, wherein the plurality of regions may be split from the gamut-corrected first image.

The metadata generation method may further include: acquiring a tone mapping function between the gamut-corrected first image and the second image based on a luminance value of pixels included in the gamut-corrected first image and a luminance value of pixels included in the second image; performing tone mapping on the gamut-corrected first image based on the tone mapping function; and generating global metadata including the tone mapping function, wherein the plurality of regions may be split from the tone-mapped first image.

The metadata generation method may further include: acquiring a saturation correction function between the tone-mapped first image and the second image based on a saturation value of pixels included in the tone-mapped first image and a saturation value of the pixels included in the second image; and performing saturation correction on the tone-mapped first image based on the saturation correction function, wherein the global metadata may further include the saturation correction function, and the plurality of regions may be split from the saturation-corrected first image.

Disclosed is an image processing method including: receiving local metadata including position information of a similar color mapping region in a first image and a color mapping function of the similar color mapping region; restoring the similar color mapping region in the first image based on the position information of the similar color mapping region; and correcting color components of pixels in the restored similar color mapping region based on the color mapping function of the similar color mapping region.

The position information of the similar color mapping region may include an upper left corner coordinate (x, y) and a right lower corner coordinate (x, y) of a bounding box with respect to the similar color mapping region.

The position information of the similar color mapping region may include at least one coordinate (x, y) of a bounding box and size information of the bounding box with respect to the similar color mapping region.

The image processing method may further include: receiving static metadata including gamut information of a second image; and correcting a color gamut of the first image based on the gamut information of the second image, wherein the similar color mapping region may be restored from the gamut-corrected first image.

The image processing method may further include: receiving global metadata including a tone mapping function between the gamut-corrected first image and the second image; and performing tone mapping on the gamut-corrected first image based on the tone mapping function, wherein the similar color mapping region may be restored from the tone-mapped first image.

The image processing method may further include performing saturation correction on the tone-mapped first image based on a saturation correction function between the tone-mapped first image and the second image, which is included in the global metadata, wherein the similar color mapping region may be restored from the saturation-corrected first image.

Disclosed is a metadata generation apparatus including: a region splitter configured to split a first image into a plurality of regions based on spatial proximity and color similarity of pixels included in the first image; a region color mapper configured to acquire a color mapping function of a first region among the plurality of regions by comparing color information of pixels in the first region with color information of pixels in a second image, which correspond to the pixels in the first region and to acquire a color mapping function of a second region among the plurality of regions by comparing color information of pixels in the second region with color information of pixels in the second image, which correspond to the pixels in the second region; a similar region setup unit configured to set the first region and the second region as a similar color mapping region by comparing the color mapping function of the first region with the color mapping function of the second region and to acquire a color mapping function of the similar color mapping region based on the color mapping function of the first region and the color mapping function of the second region; and a metadata generator configured to generate local metadata including position information of the similar color mapping region in the first image and the color mapping function of the similar color mapping region.

The region splitter may be further configured to split the first image into a foreground region and a background region based on a background model learned in a time axis and to split the foreground region and the background region into the plurality of regions.

The first region and the second region may be spatially adjacent.

The region color mapper may be further configured to acquire a color mapping function of a third region, which is adjacent to the second region, among the plurality of regions by comparing color information of pixels in the third region with color information of pixels in the second image, which correspond to the pixels in the third region, and the similar region setup unit may be further configured to set the first region through the third region as the similar color mapping region or to set the third region as a new similar color mapping region, by comparing the color mapping function of the similar color mapping region with the color mapping function of the third region.

The position information of the similar color mapping region may include an upper left corner coordinate (x, y) and a right lower corner coordinate (x, y) of a bounding box with respect to the similar color mapping region.

The position information of the similar color mapping region may include at least one coordinate (x, y) of a bounding box and size information of the bounding box with respect to the similar color mapping region.

The metadata generation apparatus may further include a gamut corrector configured to correct a color gamut of the first image based on gamut information of the second image, wherein the metadata generator may be further configured to generate static metadata including gamut information of the second image, and the plurality of regions may be split from the gamut-corrected first image.

The metadata generation apparatus may further include a tone mapper configured to acquire a tone mapping function between the gamut-corrected first image and the second image based on a luminance value of pixels included in the gamut-corrected first image and a luminance value of pixels included in the second image and to perform tone mapping on the gamut-corrected first image based on the tone mapping function, wherein the metadata generator may be further configured to generate global metadata including the tone mapping function, and the plurality of regions may be split from the tone-mapped first image.

The metadata generation apparatus may further include a saturation corrector configured to acquire a saturation correction function between the tone-mapped first image and the second image based on a saturation value of pixels included in the tone-mapped first image and a saturation value of the pixels included in the second image and to perform saturation correction on the tone-mapped first image based on the saturation correction function, wherein the global metadata may further include the saturation correction function, and the plurality of regions may be split from the saturation-corrected first image.

Disclosed is an image processing apparatus including: a receiver configured to receive local metadata including position information of a similar color mapping region in a first image and a color mapping function of the similar color mapping region; a similar region restorer configured to restore the similar color mapping region in the first image based on the position information of the similar color mapping region; and a region color mapper configured to correct color components of pixels in the restored similar color mapping region based on the color mapping function of the similar color mapping region.

The position information of the similar color mapping region may include an upper left corner coordinate (x, y) and a right lower corner coordinate (x, y) of a bounding box with respect to the similar color mapping region.

The position information of the similar color mapping region may include at least one coordinate (x, y) of a bounding box and size information of the bounding box with respect to the similar color mapping region.

The image processing apparatus may further include a gamut corrector configured to correct a color gamut of the first image based on static metadata including gamut information of a second image, which has been received by the receiver, wherein the similar color mapping region may be restored from the gamut-corrected first image.

The image processing apparatus may further include a tone mapper configured to perform tone mapping on the gamut-corrected first image based on global metadata including a tone mapping function between the gamut-corrected first image and the second image, which has been received by the receiver, wherein the similar color mapping region may be restored from the tone-mapped first image.

The image processing apparatus may further include a saturation corrector configured to perform saturation correction on the tone-mapped first image based on a saturation correction function between the tone-mapped first image and the second image, which is included in the global metadata, wherein the similar color mapping region may be restored from the saturation-corrected first image.

Disclosed is a computer-readable recording medium having recorded thereon a program, which when executed by a computer, perform any one of the methods described above.

MODE OF THE INVENTION

Hereinafter, embodiments of the present disclosure are described in detail with reference to the drawings. The embodiments described below are only to embody the present disclosure and do not restrict or limit the right scope of the present disclosure. In addition, it is analyzed that the matters which could be readily inferred by those of ordinary skill in the art from the detailed description and the embodiments of the present disclosure belong to the right scope of the present disclosure.

Throughout the specification, when a certain part is "connected" to another part, this includes both a case of "being directly connected" and a case of "being electrically connected" via another element in the middle. In addition, when a certain part "includes" a certain component, this indicates that the part may further include another component instead of excluding another component unless there is particularly different disclosure.

Hereinafter, the term "image" may indicate a still image or a moving picture of a video, i.e., the latter indicating the video itself. The term "image" may include a partial or the entire screen image displayable on a display apparatus besides a still image (e.g., a photograph) or a video. In addition, the term "image" may also originally include a displayable screen image itself such as a user interface or a webpage besides a still image (e.g., a photograph) or a video.

The term "white point" of an image may indicate a color coordinate of a white color displayed in the image. When the white point is changed, brightness of the image may vary.

The term "gamma value" indicates a representation range of a gray scale representing light and shade of an image, and adjustment of the gamma value may change a contrast of the image.

The term "color gamut" indicates a color space region displayable in an image among the whole light region. For example, gamut information may vary according to by which one of red, green, and blue (GBR) and cyan, magenta, yellow, and black (CMYK) color systems the image is displayed. According to the gamut information, the image may be classified into a wide gamut image and a narrow gamut image. For example, the wide gamut image may indicate an image having a wide gamut and include an image having a digital cinema package (DCP), digital cinema initiatives (DCI), or Adobe RGB color system or a high dynamic range (HDR) image mastered with a high light intensity and a wide gamut. The narrow gamut image may indicate an image having a narrow gamut and include an image having a 709 color level or an sRGB color system.

According to an embodiment, a color system of an image may include YCbCr (YUV), Lab, and hue saturation value (HSV) color systems but is not limited thereto and may include various color systems.

In general, the term "dynamic range" may indicate a ratio of a maximum value of a physically measured amount to a minimum value thereof. For example, a dynamic range of an image may indicate a ratio of a brightest part in the image to a darkest part therein. As another example, a dynamic range of a display apparatus may indicate a ratio of minimum brightness of light which may be emitted from a screen to maximum brightness thereof. In the real world, a dynamic range is from completed darkness close to 0 nit to very high brightness close to sunlight.

As a ratio of maximum brightness in an image to minimum brightness therein is higher, the image may be classified into a low dynamic range image, a standard dynamic range image, and a high dynamic range image. For example, an image having a bit depth of 16 bits or less for each of R, G, and B components of one pixel may represent a low dynamic range image. In addition, an image having a bit depth of 32 bits or more for each of R, G, and B components of one pixel may represent a low dynamic range image to a high dynamic range image.

When a high dynamic range image is displayed on a display apparatus having a low dynamic range without being corrected, the original intention of the high dynamic range image may be distorted and displayed.

The term "tone mapping" may indicate an operation of converting a dynamic range of an image. In detail, the tone mapping may indicate an operation of narrowing a dynamic range of an image. For example, the tone mapping may indicate an operation of converting a high dynamic range image into a low dynamic range image. In addition, the tone mapping may indicate an operation of widening a dynamic range of an image. For example, the tone mapping may indicate an operation of converting a low dynamic range image into a high dynamic range image.

When a dynamic range of an image is not included in a dynamic range of a display apparatus on which the image is displayed, the display apparatus may maintain the intention of an original image by using a tone-mapped image.

Hereinafter, an apparatus and method capable of correcting a color gamut of an input image and performing tone mapping on the input image according to the intention of an image producer and an apparatus and method capable of splitting an input image into a plurality of regions and performing additional color mapping for each region are described in detail with reference to the accompanying drawings.

FIG. 1 illustrates a block diagram of a metadata generation apparatus.

Hereinafter, for convenience of description, an input image of a metadata generation apparatus 100, which is to be corrected, is referred to as "first image". In addition, an input image of the metadata generation apparatus 100, which is a correction reference of the first image, is referred to as "second image". For example, when the first image corresponds to a low dynamic range (LDR) or a standard dynamic range (SDR), and a consumer display apparatus set as a target can display an image corresponding to a high dynamic range (HDR), the metadata generation apparatus 100 may widen a dynamic range of the first image. Otherwise, when the first image corresponds to the HDR, and the consumer display apparatus set as a target can display a narrow gamut image corresponding to the LDR or the SDR, the metadata generation apparatus 100 may narrow a dynamic range of the first image.

The metadata generation apparatus 100 may include a static mapper 110, a global mapper 120, and a local mapper 130.

The static mapper 110 may correct a color gamut of the first image based on gamut information of the second image. For example, the static mapper 110 may correct the color gamut of the first image having a narrow gamut according to the second image having a wide gamut or correct the color gamut of the first image having a wide gamut according to the second image having a narrow gamut. When a color gamut such as a white point and primary color coordinates is converted, hue of an image at same color coordinates may vary. Therefore, the metadata generation apparatus 100 may prevent an error which may occur according to a difference in a color gamut by correcting the color gamut of the first image based on the color gamut of the second image before converting the dynamic range of the first image.

In detail, the static mapper 110 may include a comparison region corrector 111 and a gamut corrector 112. Operations of the comparison region corrector 111 and the gamut corrector 112 will be described below in detail with reference to FIGS. 3 and 4.

When the first image and the second image have different color gamuts, the static mapper 110 may transmits gamut information of the first image and gamut information of the second image to a metadata generator 140. The metadata generator 140 may generate static metadata including the gamut information of the first image and the gamut information of the second image, which have been received from the static mapper 110. Alternatively, the metadata generator 140 may generate static metadata including only the gamut information of the first image or the gamut information of the second image. In this case, the consumer display apparatus set as a target may directly acquire the gamut information of the first image or the gamut information of the second image, which is not included in the static metadata. For example, the consumer display apparatus may acquire the gamut information of the first image by analyzing the received first image or acquire gamut information of the consumer display apparatus as the gamut information of the second image.

The static metadata may include the gamut information of the first image, i.e., gamut information of a mastering display apparatus by which the first image has been produced, and the gamut information of the second image, i.e., the gamut information of the consumer display apparatus set as a target. The static metadata may be determined by characteristics of the mastering display apparatus and the consumer display apparatus independently from characteristics of the first image (e.g., a maximum luminance value and a minimum luminance value of the first image). Therefore, even when content of the first image differ from content of the second image, the static metadata may be same.

The global mapper 120 may perform tone mapping and saturation correction on the first image based on a luminance component and a saturation component of the second image. For example, the global mapper 120 may widen the dynamic range of the first image having the LDR or the SDR based on the second image having the HDR or narrow the dynamic range of the first image having the HDR based on the second image having the LDR or the SDR. The global mapper 120 may perform more efficient tone mapping and saturation correction by using the first image of which the color gamut has been matched with the color gamut of the second image by the static mapper 110.

In detail, the global mapper 120 may include a tone mapper 121 and a saturation corrector 122. Operations of the tone mapper 121 and the saturation corrector 122 will be described below in detail with reference to FIGS. 5 through 7.

The global mapper 120 may transmit a scene-wise tone mapping function and a scene-wise saturation correction function between the first image and the second image to the metadata generator 140. The metadata generator 140 may generate global metadata including the scene-wise tone mapping function and the scene-wise saturation correction function. The global metadata may be set to be scene-wise and may be applied to all frames included in one scene. Frames included in one scene may refer to the same tone mapping function and the same saturation correction function included in the global metadata, and frames included in different scenes may refer to different tone mapping functions and different saturation correction functions included in metadata.

The local mapper 130 may determine whether additional color mapping on each region has been performed by comparing a plurality of regions split from the first image with a plurality of regions split from the second image. When an image producer performed specific color correction on a partial region of an image besides global mapping, the local mapper 130 may acquire a color mapping function between a corresponding region of the first image and a corresponding region of the second image.

In detail, the local mapper 130 may include a region splitter 131, a region color mapper 132, and a similar region setup unit 133. Operations of the region splitter 131, the region color mapper 132, and the similar region setup unit 133 will be described below in detail with reference to FIGS. 8 through 10.

The local mapper 130 may transmit, to the metadata generator 140, a color mapping function of a region on which additional color correction has been performed among the plurality of regions split from the first image. The metadata generator 140 may generate local metadata including the color mapping function of the corresponding region split from the first image. The local metadata may be set to be region-wise in one scene and may be applied to a corresponding region of all frames included in one scene. The same regions of frames included in one scene may refer to a same color mapping function in the local metadata, and different regions of the frames included in the one scene may refer to different color mapping functions in the local metadata.

Not all the components of the metadata generation apparatus 100 shown in FIG. 1 are mandatory components. The metadata generation apparatus 100 may be implemented by more or less components than the components shown in FIG. 1. For example, the metadata generation apparatus 100 may include at least one processor capable of performing all operations of the static mapper 110, the global mapper 120, the local mapper 130, and the metadata generator 140. Alternatively, the metadata generation apparatus 100 may include a plurality of processors corresponding to the static mapper 110, the global mapper 120, the local mapper 130, and the metadata generator 140, respectively.

Figure 2:
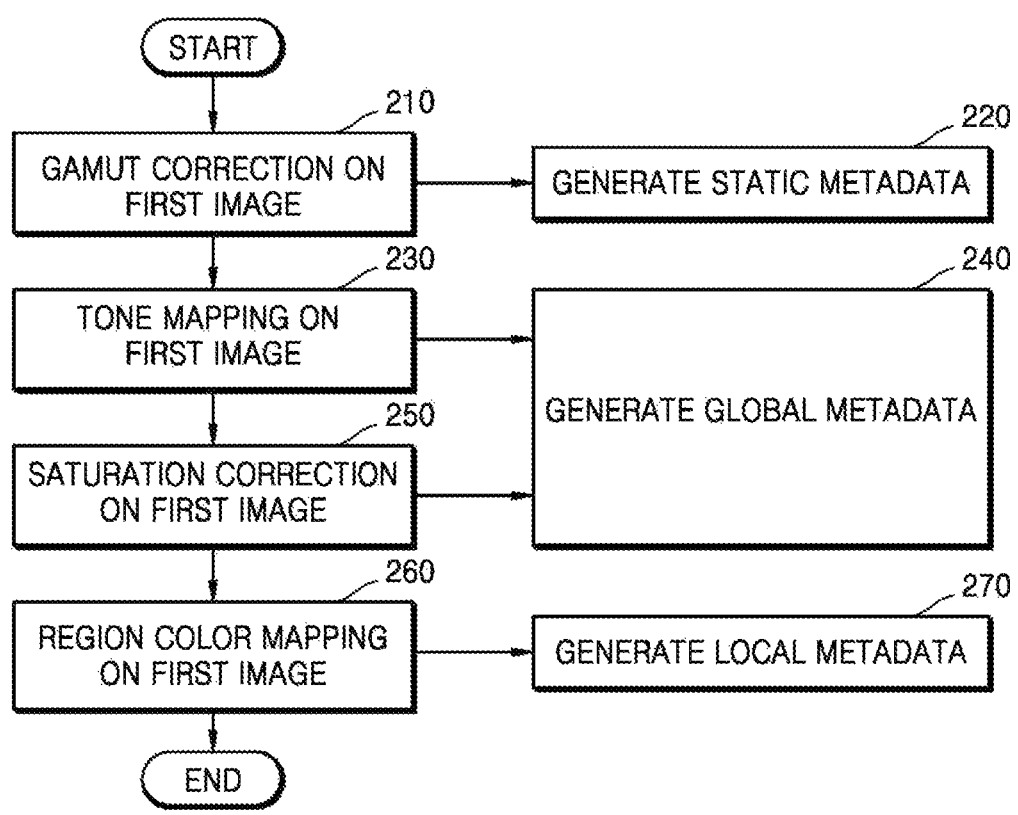
FIG. 2 illustrates a flowchart of a metadata generation method.

FIG. 2 illustrates a flowchart of a metadata generation method.

In operation 210, the static mapper 110 may correct the color gamut of the first image. When the first image and the second image have different gamut information, in operation 220, the metadata generator 140 may generate static metadata including the gamut information of the second image. When the first image and the second image have same gamut information, the color gamut of the first image may be bypassed, and operations 210 and 220 may be omitted.

In operation 230, the global mapper 120 may perform tone mapping on the first image of which the color gamut has been corrected in operation 210. When the tone mapping on the first image is performed, in operation 240, the metadata generator 140 may generate global metadata including a tone mapping function between the first image and the second image. When the tone mapping is not performed since the first image and the second image have a same dynamic range, a luminance component of the first image may be bypassed, and operations 230 and 240 may be omitted.

In operation 250, the global mapper 120 may perform saturation correction on the first image tone-mapped in operation 230. When the saturation correction on the first image is performed, in operation 240, the metadata generator 140 may generate global metadata including a saturation correction function between the first image and the second image. When the saturation correction is not performed since the first image and the second image have a same saturation component, the saturation component of the first image may be bypassed, and operations 250 and 240 may be omitted.

In operation 260, the local mapper 130 may split the first image tone-mapped in operation 230 or the first image on which additional saturation correction has been performed in operation 250 into a plurality of regions and may perform color mapping on each region. When the color mapping on the regions split from the first image is performed, the metadata generator 140 may generate local metadata including a region-wise color mapping function of a corresponding region in operation 270. When the additional color mapping on the regions split from the first image is not performed, operations 260 and 270 may be omitted.

Figure 3:
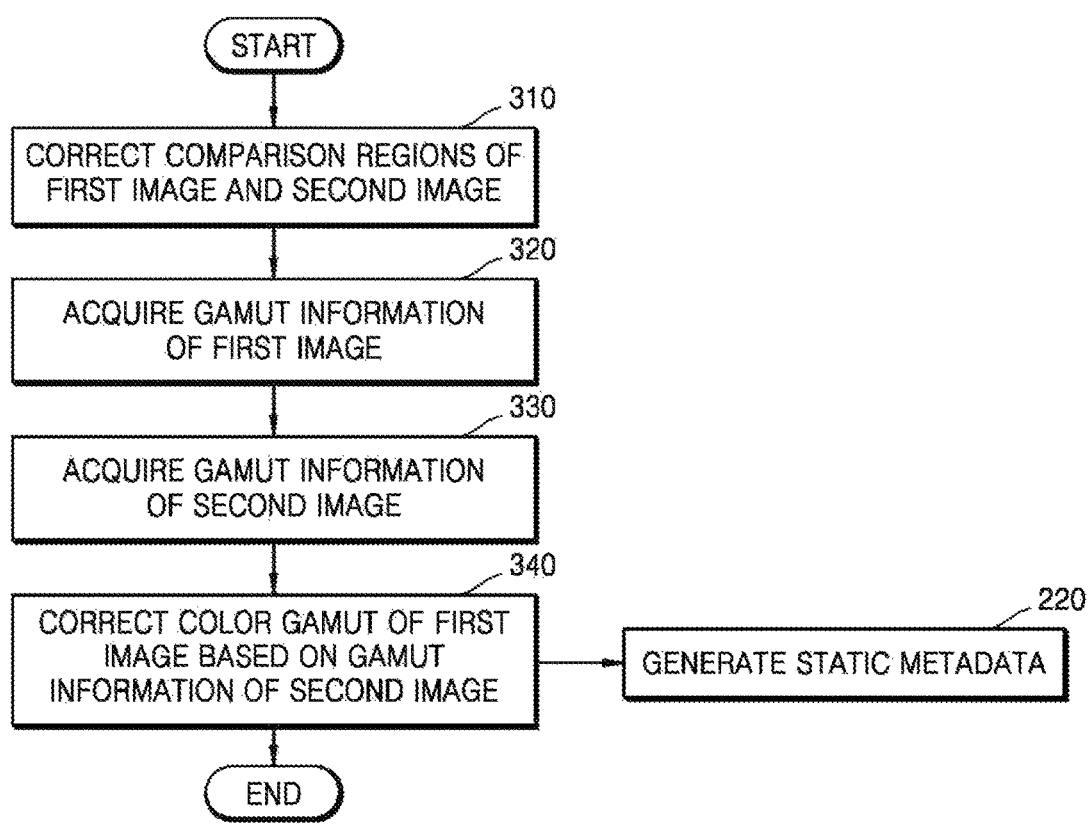
FIG. 3 illustrates a flowchart of a gamut correction method.

FIG. 3 illustrates a flowchart of a gamut correction method.

In operation 310, the comparison region corrector 111 may match a resolution of the first image with a resolution of the second image when the first image and the second image have different resolutions. In addition, when different regions are compared between the first image and the second image, the comparison region corrector 111 may match a comparison region of the first image with a comparison region of the second image such that the two regions include same content. For example, the comparison region corrector 111 may crop any one of or both the first image and the second image such that the first image and the second image include same content at a same position. In detail, the comparison region corrector 111 may extract a feature point of a predetermined region split from the first image, extract a feature point of a predetermined region split from the second image, and cut or move at least one of the first image and the second image such that the two feature points exist at a same position in the two images. Thereafter, the comparison region corrector 111 may perform image rescaling by using horizontal and vertical values of the cropped image such that two pieces of content have a same resolution.

In operation 320, the gamut corrector 112 may acquire gamut information of the first image. The gamut information of the first image may include at least one of a white point, primary color coordinates, and gamma information of the first image. The gamut corrector 112 may analyze the first image received by the metadata generation apparatus 100 to acquire the gamut information of the first image or may receive the gamut information of the first image from the outside.

In operation 330, the gamut corrector 112 may acquire gamut information of the second image. The gamut information of the second image may include at least one of a white point, primary color coordinates, and gamma information of the second image. The gamut corrector 112 may analyze the second image received by the metadata generation apparatus 100 to acquire the gamut information of the second image or may receive the gamut information of the second image from the outside.

In operation 340, the gamut corrector 112 may correct the color gamut of the first image based on the gamut information of the second image. A color corresponding to a color coordinate (a, b) in the color gamut of the first image may differ from a color corresponding to the same color coordinate (a, b) in the color gamut of the second image. Therefore, when a display apparatus capable of representing the color gamut of the second image displays the first image before the gamut correction, the first image may be displayed based on the color gamut of the second image, thereby distorting the color.

The gamut corrector 112 may convert the white point color coordinate of the first image into a white point color coordinate of the second image. An overall hue of the first image may be changed according to the converted white point. According to the white point, a result of gamut correction, tone mapping, saturation correction, and region-wise color mapping on the first image to be performed thereafter may vary, and thus, the metadata generation apparatus 100 may correct the white point of the first image first of all. When the white point of the first image is the same as the white point of the second image, the gamut corrector 112 may bypass the white point of the first image.

In addition, the gamut corrector 112 may correct the color gamut of the first image to the color gamut of the second image based on the gamma information and the primary color coordinates of the first image. A degree of linearity of an output image with respect to an input image may be determined according to a gamma value (e.g., 2.4 gamma or 2.6 gamma) and other electro optical transfer function (EOTF), and as the gamma value increases, an image may be dark. The gamut corrector 112 may convert a color space of the first image into a linearized RGB color space by performing inverse gamma correction on the first image based on the gamma information applied to the first image. The gamut corrector 112 may map the color gamut of the first image to the color gamut of the second image in the linearized RGB color space of the inverse gamma-corrected first image. For example, when the first image has a 709 narrow gamut and the second image has a DCI wide gamut, the gamut corrector 112 may map the color gamut of the first image to a 709 narrow gamut representable within the DCI wide gamut. A wide gamut display apparatus may display the first image corrected to a narrow gamut representable within a wide gamut, without color distortion. In detail, the gamut corrector 112 may map the primary color coordinates of the first image to the primary color coordinates of the second image. For example, the gamut corrector 112 may correct color coordinates of each of red (R), green (G), and blue (B) of the first image based on R, G, and B color coordinates of the second image.

The gamut corrector 112 may restore a gamma value which the first image has by further performing gamma correction on the gamut-corrected first image. A gamma value applicable to the first image may be the gamma value applied before the inverse gamma correction on the first image. The white point, the primary color coordinates, and the gamma information may be predetermined according to image types of the first image and the second image, e.g., an Adobe RGB or DCI wide gamut image or a 709 or sRGB narrow gamut image. When the color gamut of the first image is corrected, in operation 220, the metadata generator 140 may generate static metadata including at least one of the white point, the primary color coordinates, and the gamma information of the first image and the white point, the primary color coordinates, and the gamma information of the second image.

Figure 4:
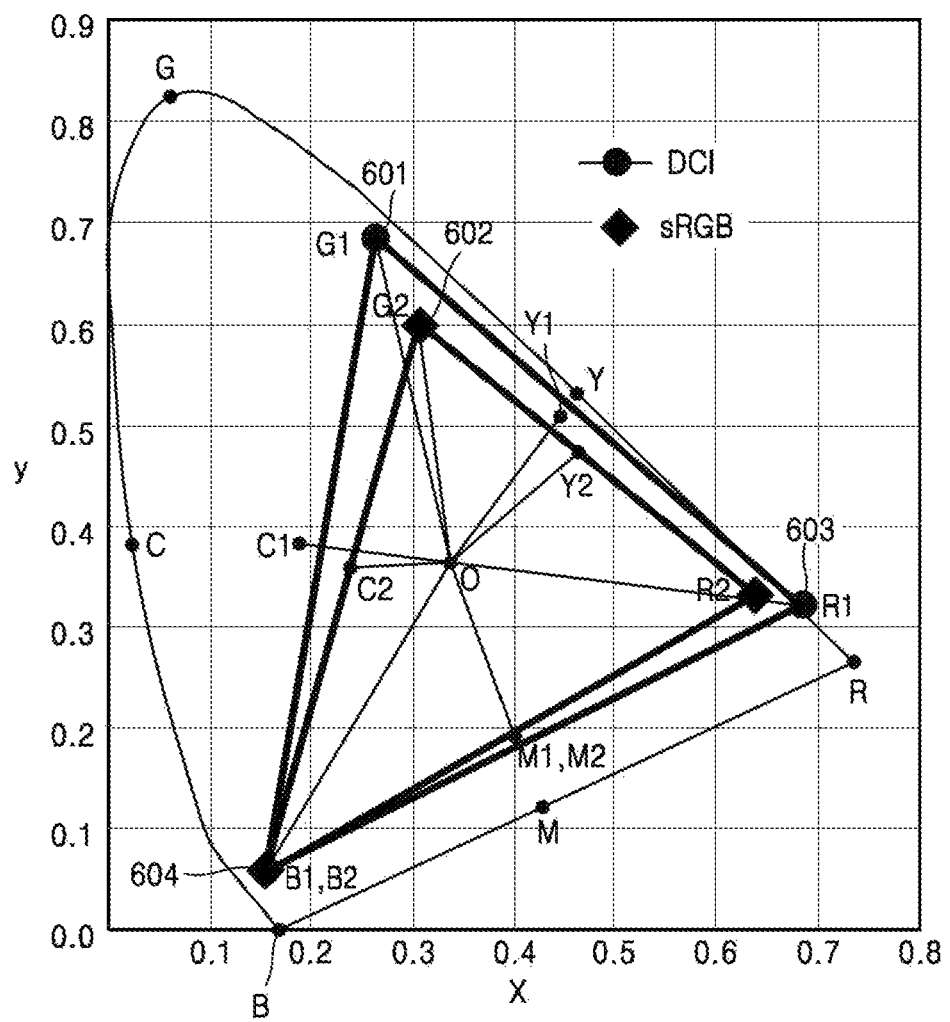
FIG. 4 illustrates a narrow gamut and a wide gamut.

FIG. 4 illustrates a narrow gamut and a wide gamut.

Referring to FIG. 4, a color gamut of a DCI image belonging to a relatively wide gamut image and a color gamut of an sRGB image belonging to a relatively narrow gamut image are shown. The color gamut of the DCI image is wider than the color gamut of the sRGB image, and particularly, a gamut difference in a G color is great.

As described above, since color coordinates indicating primary colors vary according to each color gamut, even though color information of a pixel is same, a displayed color may vary according to a color gamut. Therefore, the metadata generation apparatus 100 may map the color gamut of the first image to the color gamut of the second image to prevent color distortion.

According to an embodiment, when a white point of a narrow gamut image is converted into a white point of a wide gamut image, a zero point in a color gamut of the narrow gamut image may be the same as a zero point in a color gamut of the wide gamut image. Although FIG. 4 shows that a zero point in a narrow gamut is the same as a zero point in a wide gamut, the present embodiment is not limited thereto, and the zero point in the narrow gamut differ from the zero point in the wide gamut.

Figure 5:
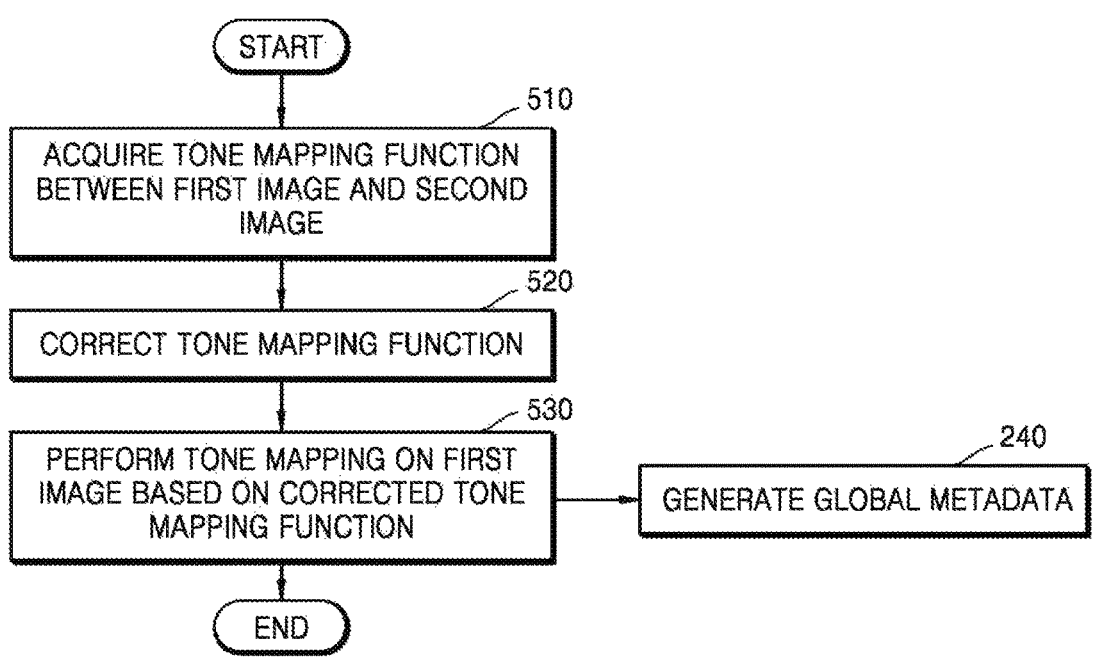
FIG. 5 illustrates a flowchart of a tone mapping method.

FIG. 5 illustrates a flowchart of a tone mapping method.

In operation 510, the tone mapper 121 may acquire a tone mapping function between the gamut-corrected first image and the second image.

The tone mapping function may be acquired to be scene-wise. In detail, the tone mapper 121 may split the first image and the second image to be scene-wise and compare a luminance value of the scene-wise split first image with a luminance value of the scene-wise split second image to acquire the tone mapping function between the gamut-corrected first image and the second image for each scene.

The tone mapper 121 may acquire a luminance (Y) value indicating brightness information by converting RGB values of pixels in the first image and the second image.

$$Y=(w1*R+w2*G+w3*B)/(w1+w2+w3) \quad (1)$$

For example, the Y value may be acquired by applying weights to R, G, and B values as in Equation 1. The weights w1, w2, and w3 may be variously set according to methods of obtaining a luminance value. For example, when analog RGB is converted into analog YPbPr, it may be set that w1=0.299, w2=0.587, w3=0.114, Y=0.299R+0.587G+0.114B. As another example, when digital RGB having an eight-bit depth for each sample is converted into digital YCbCr, it may be set that w1=65.481, w2=128.553, w3=24.966, Y=16+(65.481R+128.553G+24.966B).

$$Y=\max(R,G,B) \quad (2)$$

As another example, the Y value may be determined as a maximum value of R, G, B values as in Equation 2. As another example, the Y value may be determined as a minimum value, an intermediate value, or a mean value of the R, G, B values.

The tone mapper 121 may obtain a tone mapping function indicating a luminance value of the second image with respect to a luminance value of the first image by using a differential value between a luminance value of a pixel in the first image and a luminance value of a pixel in the second image, which corresponds to the pixel in the first image. Luminance values of pixels of the first image and the second image, which exist at a same position, may correspond to each other.

In operation 520, the tone mapper 121 may correct the tone mapping function acquired in operation 510. In the tone mapping function acquired in operation 510, a plurality of luminance values of the second image may match a same luminance value of the first image, or a plurality of luminance values of the first image may match a same luminance value of the second image. When the consumer display apparatus set as a target performs tone mapping on the first image by using metadata, if the tone mapping function is not a one-to-one function, it is difficult for the consumer display apparatus to clearly perform tone mapping on the first image. Therefore, the tone mapper 121 may correct the tone mapping function in operation 520 such that the tone mapping function acquired in operation 510 has a one-to-one corresponding relationship. For example, the tone mapper 121 may perform linear regression on the tone mapping function acquired in operation 510 to correct the tone mapping function such that one input value matches a mean value or an intermediate value of a plurality of output values.

In operation 530, the metadata generator 140 may perform tone mapping on the first image based on the tone mapping function acquired in operation 510 or the tone mapping function corrected in operation 520. For example, the first image having the LDR or the SDR may expand a dynamic range thereof according to the second image having the HDR. Alternatively, a dynamic range of the first image having the HDR may be reduced according to the second image having the LDR or the SDR.

When tone mapping on the first image is performed in operation 530 since the dynamic range of the first image differs from the dynamic range of the second image, in operation 240, the metadata generator 140 may generate global metadata including the tone mapping function acquired in operation 510 or the tone mapping function corrected in operation 520. The metadata generator 140 may generate global metadata including an input value and an output value of a corrected tone mapping function. For example, the metadata generator 140 may generate global metadata in which output luminance values with respect to input luminance values of the tone mapping function are represented as a lookup table (LUT). Alternatively, the metadata generator 140 may generate global metadata in which gains of the output luminance values with respect to the input luminance values of the tone mapping function are represented as the LUT. For example, the LUT may respectively indicate output luminance values or input-to-output gains with respect to 64 input luminance values.

Figure 6:
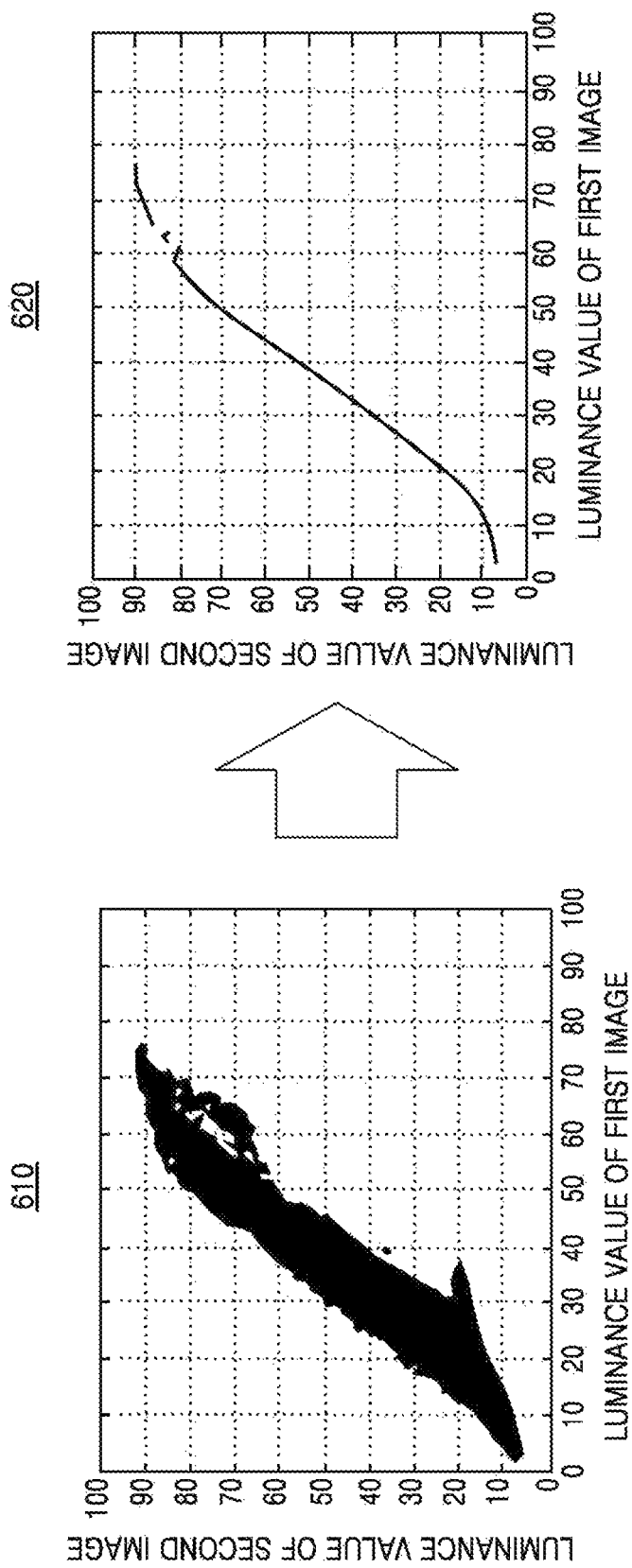
FIG. 6 illustrates an operation of correcting a tone mapping function.

FIG. 6 illustrates an operation of correcting a tone mapping function.

A graph 610 may correspond to the tone mapping function before correction, which is acquired in operation 510. In the graph 610, an x-axis may indicate a luminance value of the first image, and a y-axis may indicate a luminance value of the second image. Referring to the graph 610, one luminance value of the first image may correspond to a plurality of luminance values of the second image. Therefore, when the tone mapping function before correction as shown in the graph 610 is used as it is, it is difficult to properly perform tone mapping on the first image.

Therefore, the tone mapper 121 may correct the tone mapping function such that luminance values of the first image and luminance values of the second image have a one-to-one corresponding relationship as shown in a graph 620. For example, the tone mapper 121 may determine a representative value among a plurality of luminance values of the second image, which correspond to a luminance value of the first image, and correct the tone mapping function such that only the determined representative value corresponds to the luminance value of the first image. For example, the tone mapper 121 may correct the tone mapping function by determining representative luminance values, which respectively correspond to 64 input luminance values.

Figure 7:
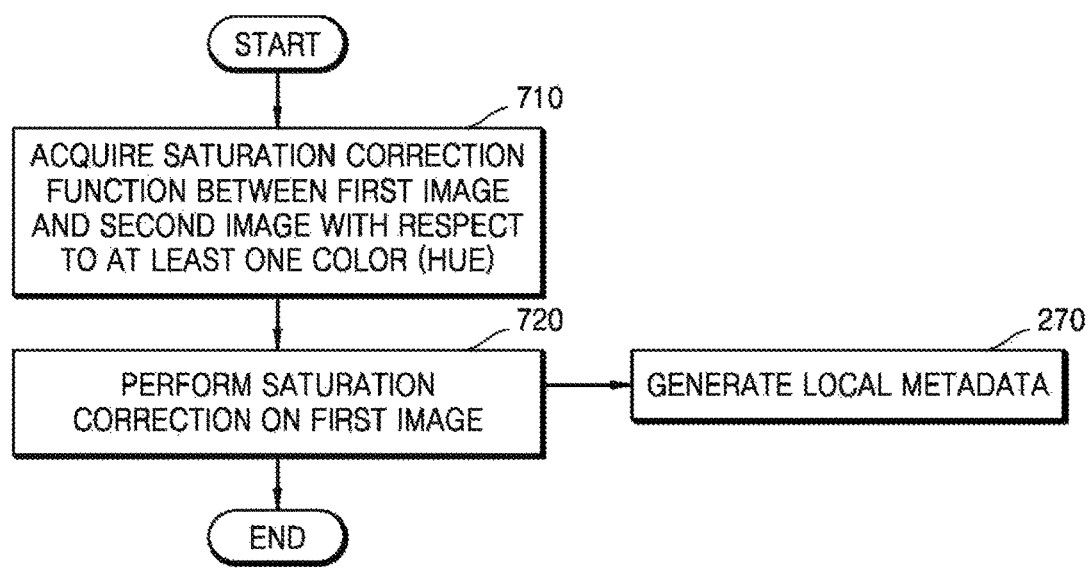
FIG. 7 illustrates a flowchart of a saturation correction method.

FIG. 7 illustrates a flowchart of a saturation correction method.

In operation 710, the saturation corrector 122 may acquire a saturation correction function between the second image and the tone-mapped first image with respect to at least one color (hue). The saturation correction function may be acquired to be scene-wise. In detail, the saturation corrector 122 may split the first image and the second image to be scene-wise and compare a saturation value of the scene-wise split first image with a saturation value of the scene-wise split second image to acquire the saturation correction function between the first image and the second image for each scene.

The saturation corrector 122 may obtain a saturation correction function indicating a saturation value of the second image with respect to a saturation value of the first image by using a differential value between a saturation value of a pixel in the first image and a saturation value of a pixel in the second image, which corresponds to the pixel in the first image. Saturation values of pixels of the first image and the second image, which exist at a same position, may correspond to each other.

The saturation corrector 122 may generate a saturation correction function indicating a saturation value of the second image, which corresponds to a saturation value of the first image, for each color (hue). Referring to FIG. 4, six colors in the DCI gamut and the sRGB gamut are shown. For example, the saturation corrector 122 may generate a saturation correction function of each of the six colors R, G, B, C, M, and Y. For the G color, a saturation correction function may be generated with respect to saturation values from 0 to G1 and saturation values from 0 to G2, which are shown in FIG. 6. The saturation correction function may indicate saturation values from 0 to G1 of a DCI wide gamut image according to saturation values from 0 to G2 of an sRGB narrow gamut image, wherein 0 indicates a point where a saturation value is the lowest, and G1 and G2 indicate points where primary colors having the highest saturation value in the respective color gamuts are located. Likewise, for the Y, C, B, M, and R colors, the saturation correction function may indicate saturation values from 0 to Y1, C1, B1, M1, and R1 of the wide gamut image, which correspond to saturation values from 0 to Y2, C2, B2, M2, and R2 of the sRGB narrow gamut image.

Like the tone mapping function before correction, which is acquired in operation 510, for the saturation correction function of each color, a plurality of saturation values corresponding to one saturation value may also exist. The saturation corrector 122 may determine a representative value based on a plurality of wide gamut image saturation values of the second image, which correspond to one input saturation value of the first image. The saturation corrector 122 may correct the saturation correction function such that the saturation correction function has a one-to-one corresponding relationship, based on selected representative saturation values of the second image.

Referring back to FIG. 7, in operation 720, the saturation corrector 122 may perform saturation correction on the first image based on the saturation correction function of each color, which is acquired in operation 710. The first image of which gamut correction, tone mapping and saturation correction have been performed may be represented closer to the second image.

When the saturation correction is performed in operation 720, in operation 270, the metadata generator 140 may generate global metadata including the saturation correction function acquired in operation 710. The metadata generator 140 may generate metadata by another method according to a mastering intention. When the first image and the second image are mastered according to a clipping scheme, values belonging to the color gamut of the first image among saturation values of the first image may be the same as saturation values of the second image. Therefore, the metadata generator 140 may generate metadata such that a saturation correction gain of a corresponding pixel is 1. However, for values belonging not to the color gamut of the first image but to the color gamut of the second image among the saturation values of the first image, the metadata generator 140 may generate metadata including a gain obtained by dividing a saturation value of a corresponding pixel of the second image by a saturation value of a corresponding pixel of the first image. In addition, when the first image and the second image are mastered according to a compression scheme, the metadata generation apparatus 100 may generate metadata including a gain obtained by dividing a saturation value of the second image by a saturation value of the first image.

Figure 8:
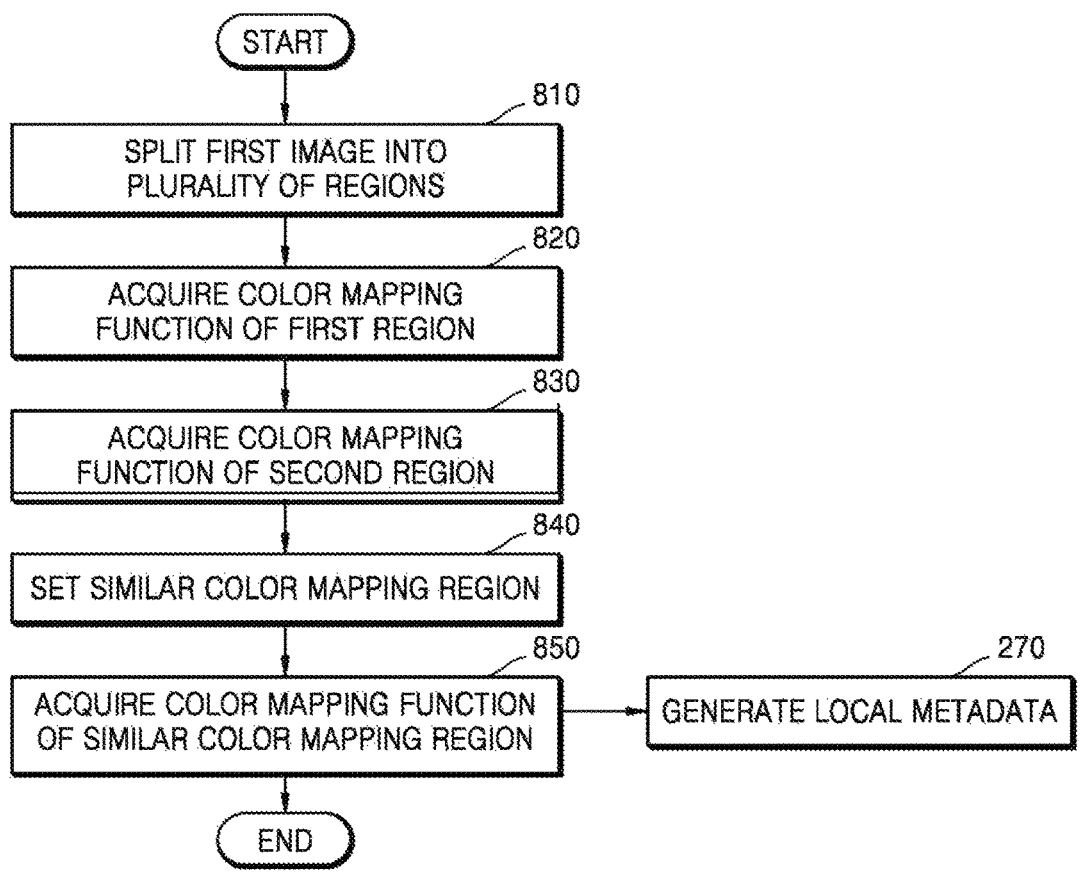
FIG. 8 illustrates a flowchart of region-wise color mapping.

FIG. 8 illustrates a flowchart of region-wise color mapping.

In operation 810, the region splitter 131 may split, into a plurality of regions, the first image on which gamut correction has been performed based on the static metadata including the gamut information of the second image and then tone mapping and saturation correction have been performed based on the global metadata including the tone mapping function and the saturation correction function between the second image and the gamut-corrected first image. That is, the plurality of regions in operation 810 may be split from the first image on which the gamut correction, the tone mapping, and the saturation correction have been performed. However, when the color gamut of the first image matches the color gamut of the second image, the gamut correction is not performed, and thus, the plurality of regions in operation 810 may be split from the first image on which the tone mapping and the saturation correction have been performed. Alternatively, when the tone mapping and the saturation correction on the first image are not performed, the plurality of regions in operation 810 may be split from the first image on which only gamut correction has been performed. Alternatively, when the saturation correction on the first image is not performed, the plurality of regions in operation 810 may be split from the first image on which the gamut correction and the tone mapping have been performed.

First, the region splitter 131 may split the first image into a foreground region and a background region based on a background model learned in a time axis. For example, pixels having a relatively small change in color information along a time elapse within one scene may be classified as the background region, and pixels having a relatively large change in color information along a time elapse within one scene may be classified as the foreground region. A pixel and a region having a large change along time have a high probability of belonging to the foreground region as a frequently moving object.

Next, the region splitter 131 may split the foreground region and the background region into a plurality of particular regions. In detail, the region splitter 131 may split the foreground region into a plurality of particular regions and split the background region into a plurality of particular regions, based on spatial proximity of pixels. For example, a width and a height of one particular region may be limited to be within a critical pixel distance. As another example, an area of one particular region may be limited to be within a critical value. Alternatively, the region splitter 131 may split the foreground region into a plurality of particular regions and split the background region into a plurality of particular regions, based on color similarity of pixels. For example, RGB values of pixels included in one particular region may be limited to be within a critical range. As another example, pixels included in one particular region may be represented in a critical color gamut. The region splitter 131 may classify content of the first image based on spatial proximity and color similarity of pixels.

The region color mapper 132 may acquire color mapping functions of the plurality of regions of the first image, which have been acquired in operation 810. In detail, the region color mapper 132 may acquire a color mapping function of each of the plurality of regions of the first image by comparing the plurality of regions split from the first image with the plurality of regions split from the second image.

In operation 820, the region color mapper 132 may acquire a color mapping function of a first region among the plurality of regions split from the first image by comparing color information of pixels in the first region with color information of pixels in a region split from the second image, which corresponds to the first region. Herein, the first region of the first image and the region of the second image, which corresponds to the first region, may exist at a same position and include same content Like the tone mapping function before correction, which is acquired in operation 510, for the color mapping function of the first region, a plurality of pieces of color information corresponding to one piece of input color information may also exist. The region color mapper 132 may determine a representative value based on a plurality of pieces of color information of the region of the second image, which correspond to one piece of input color information of the first region of the first image. Therefore, the region color mapper 132 may correct the color mapping function such that the color mapping function has a one-to-one corresponding relationship.

In operation 830, the region color mapper 132 may acquire a color mapping function of a second region split from the first image by comparing color information of pixels in the second region with color information of pixels in a region split from the second image, which corresponds to the second region. As described above with reference to operation 820, the region color mapper 132 may correct the color mapping function of the second region such that the color mapping function of the second region has a one-to-one corresponding relationship.

Herein, the color information of pixels in the first or second region may include hue, saturation, and value, which are HSV color components of a pixel, and a color temperature value. However, color information of a pixel is not limited thereto and may include various color components such as RGB and YCbCr. The region color mapper 132 may acquire a differential value or a mapping function between hue, saturation, value, and a color temperature value of the first region of the first image and hue, saturation, value, and a color temperature value of the region of the second image, which corresponds to the first region.

When there is no difference between the color information of the first region and the color information of the region of the second image, which corresponds to the first region, additional region-wise color mapping using local metadata is not performed for the first region besides the gamut correction using the static metadata and the tone mapping and the saturation correction using the global metadata. However, when there is a difference between the color information of the first region and the color information of the region of the second image, which corresponds to the first region, additional region-wise color mapping using local metadata may be performed for the first region besides the gamut correction using the static metadata and the tone mapping and the saturation correction using the global metadata. When the image producer performs additional mastering on a predetermined region split from the first image, region-wise color mapping may exist.

In operation 840, the similar region setup unit 133 may set the first region and the second region as a similar color mapping region by comparing the color mapping function of the first region, which has been acquired in operation 820, with the color mapping function of the second region, which has been acquired in operation 830.

Although the first region and the second region split from the first image in operation 810 may include different pieces of content, the region-wise color mapping function applied to the first region and the region-wise color mapping function applied to the second region may be the same as or similar to each other. For example, when the first region is an eye of a human being and the second region is a nose of the human being, the image producer may perform same color correction on the eye and nose of the human being. In this case, a color mapping function applied to the eye that is the first region and a color mapping function applied to the nose that is the second region may be the same as each other, and the similar region setup unit 133 may set the eye that is the first region and the nose that is the second region as a similar color mapping region. However, the color mapping function applied to the eye that is the first region differs from the color mapping function applied to the nose that is the second region, the first region and the second region may be set as different similar regions.

The similar region setup unit 133 may extract a representative value from the region-wise color mapping function of the first region, extracts a representative value from the region-wise color mapping function of the second region, compare the extracted representative values with each other, and determine whether to set the first region and the second region as a similar color mapping region. For example, the similar region setup unit 133 may compare a value output when intermediate values of hue, saturation, value, and color temperature are set as inputs of the color mapping function of the first region with a value output when intermediate values of hue, saturation, value, and color temperature are set as inputs of the color mapping function of the second region.

In operation 850, the similar region setup unit 133 may acquire a color mapping function of the similar color mapping region set in operation 840, based on the color mapping function of the first region, which has been acquired in operation 820, and the color mapping function of the second region, which has been acquired in operation 830. For example, the similar region setup unit 133 may set the color mapping function of the first region or the color mapping function of the second region as the color mapping function of the similar color mapping region. Alternatively, the similar region setup unit 133 may set a mean value of the color mapping function of the first region and the color mapping function of the second region as the color mapping function of the similar color mapping region as in Equation 3.

$$SR(x) = (R1(x) + R2(x))/2 \quad (3)$$

In Equation 3, an input value x may correspond to color information of a pixel. In addition, SR(x) may correspond to the color mapping function of the similar color mapping region, R1(x) may correspond to the color mapping function of the first region, and R2(x) may correspond to the color mapping function of the second region.

The similar region setup unit 133 may transmit the color mapping function and position information of the similar color mapping region to the metadata generator 140. A method of setting position information of a similar color mapping region will be described below in detail with reference to FIGS. 9 and 10.

The metadata generator 140 may generate local metadata including color mapping functions of regions on which additional color mapping has been performed among the plurality of regions split from the first image.

Figure 9:
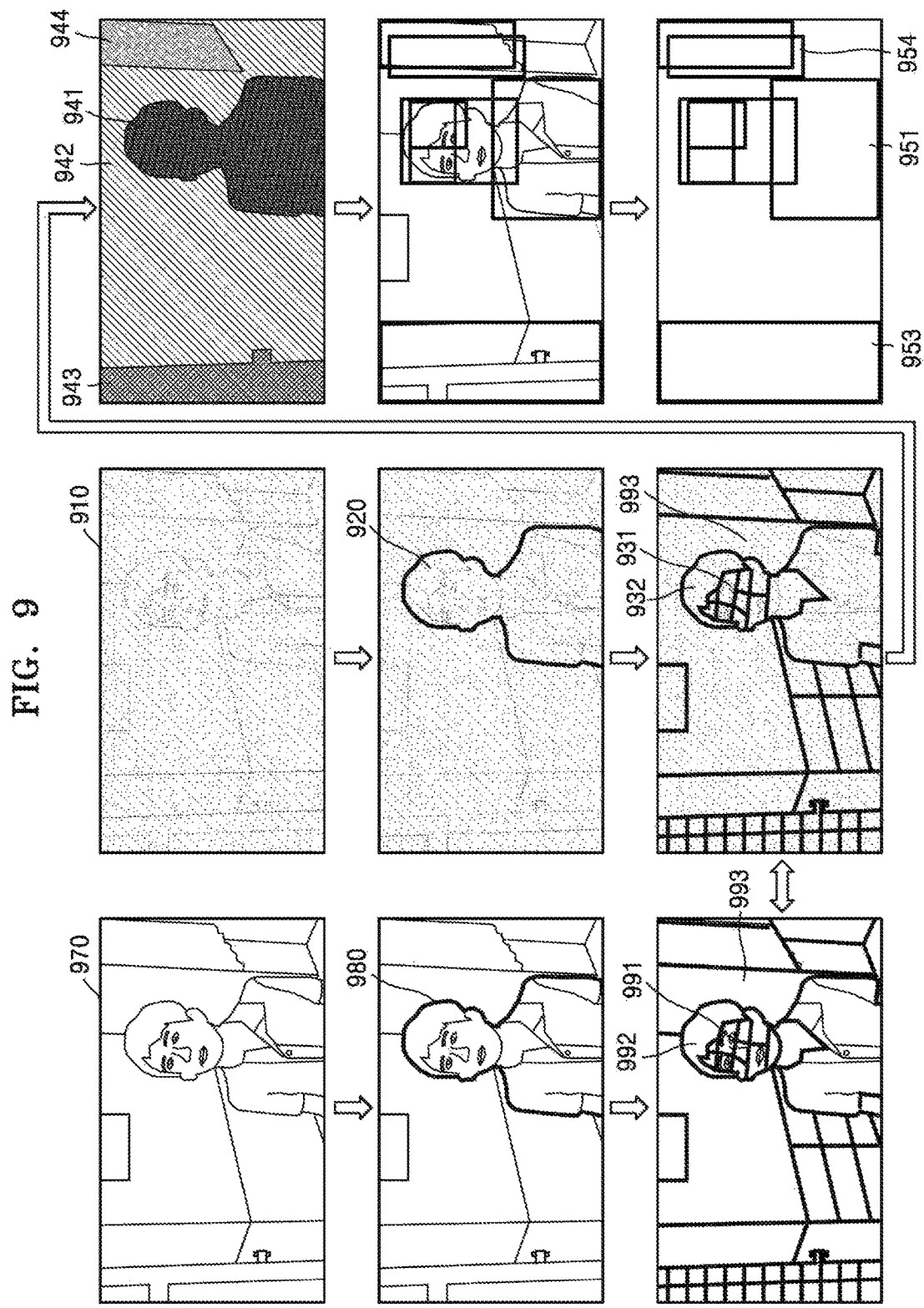
FIG. 9 illustrates an operation of acquiring a color mapping function and position information of a similar color mapping region.

FIG. 9 illustrates an operation of acquiring a color mapping function and position information of a similar color mapping region.

A first image 910 shown in FIG. 9 may be a result obtained by performing gamut correction based on static metadata including gamut information of a second image 970 and then performing tone mapping and saturation correction based on global metadata including a tone mapping function and a saturation correction function between the gamut-corrected first image 910 and the second image 970. For example, the gamut-corrected, tone-mapped, and saturation-corrected narrow gamut LDR first image 910 may be displayed on a consumer display that is a target display to be close to the wide gamut HDR second image 970.

The region splitter 131 may split the first image 910 into a foreground region 920 and a background region. The region splitter 131 may extract a person that is the foreground region 920 from content of the first image 910 based on a background model learned in a time axis. In addition, the region splitter 131 may split the foreground region 920 and the background region of the first image 910 into a plurality of particular regions 931, 932, and 933. For example, the region splitter 131 may split the person into hair, a face, a neck, a torso, and the like based on spatial proximity and color similarity of pixels in the person that is the foreground region 920 of the first image 910.

In addition, the region splitter 131 may split the second image 970 into a foreground region 980 and a background region and split the foreground region 980 and the background region into a plurality of particular regions 991, 992, and 993, by the same method as applied to the first image 910. However, the region splitter 131 may acquire the plurality of regions 991, 992, and 993 in the second image 970, which correspond to the plurality of regions 931, 932, and 933 in the first image 910, based on position information of the plurality of regions 931, 932, and 933 split from the first image 910 without splitting the second image 970 again.

The region color mapper 132 may acquire a region-wise color mapping function by comparing the plurality of regions 931, 932, and 933 split from the first image with the plurality of regions 991, 992, and 993 split from the second image. For example, the region color mapper 132 may compare hue, saturation, value, and color temperature of an eye that is a first region 931 of the first image with hue, saturation, value, and color temperature of the eye that is the region 991 of the second image 970, which corresponds to the first region 931, and may determine whether an image producer has performed additional color mapping on hair of the first image 910 besides gamut correction and scene-wise tone mapping and saturation correction. As another example, the region color mapper 132 may compare hue, saturation, value, and color temperature of hair that is a second region 932 of the first image with hue, saturation, value, and color temperature of hair that is the region 992 of the second image 970, which corresponds to the second region 932, and may determine whether the image producer has performed additional color mapping on the hair of the first image 910.

The similar region setup unit 133 may set a similar color mapping region 941 including the first region 931 and the second region 932, based on a color mapping function of the first region 931 and a color mapping function of the second region 932 among the plurality of regions 931, 932, and 933 split from the first image 910. The similar region setup unit 133 may set, as a similar color mapping region, a plurality of regions in the first image on which same or similar color mapping has been performed.

For example, the similar region setup unit 133 may classify the plurality of regions 931, 932, and 933 split from the first image 910 into a first similar color mapping region 941 corresponding to the person, a second color mapping region 942 corresponding to a wall, a third color mapping region 943 corresponding to a door, and a fourth color mapping region 944 corresponding to a window, based on color mapping functions between the plurality of regions 931, 932, and 933 split from the first image 910 and the plurality of regions 991, 992, and 993 split from the second image 970. Therefore, the same or similar color mapping may be applied to the plurality of regions 931 and 932 corresponding to the hair, the eye, and the nose in the first similar color mapping region 941 corresponding to the person.

The similar region setup unit 133 may acquire a color mapping function of the similar color mapping region 941, 942, 943, or 944 based on a plurality of regions included in one similar color mapping region 941, 942, 943, or 944. For example, the similar region setup unit 133 may set a color mapping function of the first similar color mapping region 941 based on the color mapping function of the first region 931 and the color mapping function of the second region 932, the first and second regions 931 and 932 being included in the first similar color mapping region 941.

In addition, the similar region setup unit 133 may set, as a similar color mapping region, adjacent regions among the plurality of regions 931, 932, and 933 split from the first image. For example, the similar region setup unit 133 may set the first region 931 and the second region 932, which is spatially adjacent to the first region 931, as the first similar color mapping region 941. In addition, the similar region setup unit 133 may compare a color mapping function of a third region 933, which is adjacent to the second region 932, with the color mapping function of the first similar color mapping region 941 to set the first region 931, the second region 932, and the third region 933 as the first similar color mapping region or to set a new similar color mapping region from the third region 933. For example, referring to FIG. 9, since the color mapping function of the third region 933 corresponding to the wall is not similar to the color mapping function of the first similar color mapping region 941, the third region 933 may be not included in the first similar color mapping region 941 and may be set as the second similar color mapping region 942.

The similar region setup unit 133 may transmit position information and color mapping functions of the plurality of similar color mapping regions 941, 942, 943, and 944 split from the first image 910 to the metadata generator 140.

The metadata generator 140 may generate local metadata including the position information of the plurality of similar color mapping regions 941, 942, 943, and 944 in the first image 910. The metadata generator 140 may generate the position information of the similar color mapping regions 941, 942, 943, and 944 in a bounding box form to minimize an amount of data.

In detail, the metadata generator 140 may generate a position of the similar color mapping region 941, 942, 943, or 944 as position coordinates of at least one bounding box based on a size and a shape of the similar color mapping region 941, 942, 943, or 944. For example, position information of the person that is the first similar color mapping region 941 classified from the first image 910 may be generated as position coordinates of four bounding boxes 951 including the first similar color mapping region 941. In addition, position information of the door that is the third similar color mapping region 943 classified from the first image 910 may be generated as position coordinates of one bounding box 953 including the third similar color mapping region 943. In addition, a window that is the fourth similar color mapping region 944 classified from the first image 910 may be generated as position coordinates of two bounding boxes 954 including the fourth similar color mapping region 944. However, for the wall that is the second similar color mapping region 942 classified from the first image 910, no bounding boxes may be generated since additional color mapping has not been performed thereon. A detailed description of the bounding boxes 951, 953, and 954 will be described below in detail with reference to FIG. 10.

In addition, the metadata generator 140 may generate index information of the bounding boxes 951, 953, and 954 besides the position coordinates of the bounding boxes 951, 953, and 954. The index information of the bounding boxes 951, 953, and 954 may indicate that the bounding boxes 951, 953, and 954 correspond to which one of the plurality of similar color mapping regions 941, 942, 943, and 944 classified from the first image 910. For example, the index information of the four bounding boxes 951 corresponding to the first similar color mapping region 941 may correspond to 1, the index information of the one bounding box 953 corresponding to the third similar color mapping region 943 may correspond to 3, and the index information of the two bounding boxes 954 corresponding to the fourth similar color mapping region 944 may correspond to 4.

The metadata generator 140 may generate local metadata including color mapping functions of the similar color mapping regions 941, 942, 943, and 944 in the first image 910. Like the index information of the bounding boxes 951, 953, and 954, the metadata generator 140 may generate index information of a region-wise color mapping function. The index information of the region-wise color mapping function may indicate that the region-wise color mapping function corresponds to which one of the plurality of similar color mapping regions 941, 942, 943, and 944 classified from the first image 910. For example, index information of a region-wise color mapping function corresponding to the first similar color mapping region 941 may correspond to 1, index information of a region-wise color mapping function corresponding to the third similar color mapping region 943 may correspond to 3, and index information of a region-wise color mapping function corresponding to the fourth similar color mapping region 944 may correspond to 4. However, for the wall that is the second similar color mapping region 942 classified from the first image 910, neither a color mapping function nor an index may be generated since additional color mapping has not been performed thereon.

Figure 10:
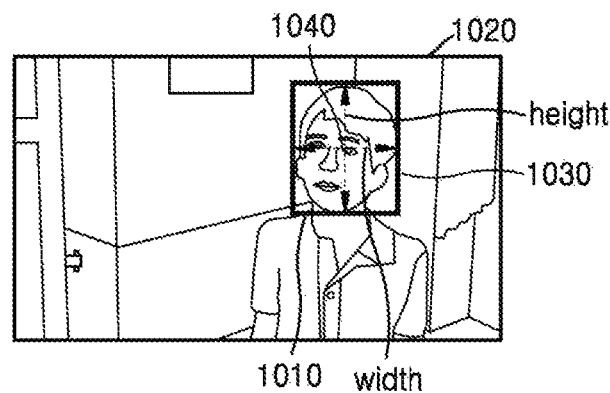
FIG. 10 illustrates a bounding box, according to an embodiment.

FIG. 10 illustrates a bounding box, according to an embodiment.

For example, the local metadata generated by the metadata generator 140 may include an upper left corner coordinate (x, y) 1020 and a lower right corner coordinate (x, y) 1030 of a bounding box 1010 for the first similar color mapping region 941. The bounding box 1010 may be restored as a rectangle connecting the upper left corner coordinate (x, y) 1020 and the lower right corner coordinate (x, y) 1030 of the bounding box 1010.

As another example, the local metadata may include at least one coordinate (x, y) and size information (width, height) of the bounding box 1010 for the first similar color mapping region 941. For example, the bounding box 1010 may be restored based on one coordinate (x, y) located at a vertex of the bounding box 1010 (e.g., the upper left corner coordinate (x, y) 1020 or the lower right corner coordinate (x, y) 1030), the width of the bounding box 1010, and the height of the bounding box 1010. As another example, the bounding box 1010 may be restored based on a coordinate (x, y) 1040 located at a center of the bounding box 1010, a half of the width of the bounding box 1010, and a half of the height of the bounding box 1010.

The metadata generator 140 may minimize an amount of data indicating the position information of the first similar color mapping region 941 by using the position information and the size information of the bounding box 1010.

Figure 11:
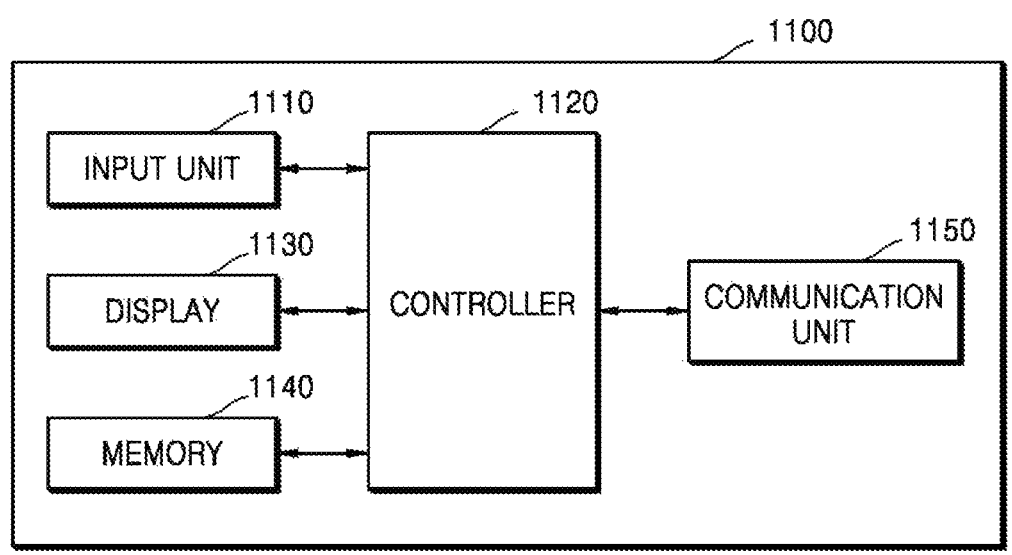
FIG. 11 illustrates a block diagram of an image encoding apparatus.

FIG. 11 illustrates a block diagram of an image encoding apparatus.

An image encoding apparatus 1100 may include an input unit 1110, a controller 1120, a display 1130, a communication unit 1150, and a memory 1140. Not all the components of the image encoding apparatus 1100 shown in FIG. 11 are mandatory components. The image encoding apparatus 1100 may be implemented by more or less components than the components shown in FIG. 11.

The input unit 1110 may receive an image. For example the input unit 1110 may receive the first image and the second image described above with reference to FIGS. 1 through 10. For example, the input unit 1110 may take therein a recording medium, such as a CD, a DVD, or a USB, including the first image and the second image.

The controller 1120 may include at least one processor and control an overall operation of the image encoding apparatus 1100. The controller 1120 may include the metadata generation apparatus 100 described above with reference to FIGS. 1 through 10. For example, the controller 1120 may perform gamut correction, tone mapping, saturation correction, and region-wise color mapping on the first image based on the second image.

The display 1130 may display an input image of the image encoding apparatus 1100. For example, the display 1130 may display an original image of the first image, the first image on which the gamut correction, the tone mapping, the saturation correction, and the region-wise color mapping have been performed, and the second image.

The memory 1140 may include at least one type of a storage medium among a flash memory type memory, a hard disk type memory, a multimedia card micro type memory, a card type memory (e.g., an SD or XD memory), random access memory (RAM), static RAM (SRAM), read-only memory (ROM), electrically erasable programmable ROM (EEPROM), PROM, a magnetic memory, a magnetic disc, and an optical disc.

The communication unit 1150 may include one or more components enabling the image encoding apparatus 1100 to perform data communication with an external device or a server. For example, the communication unit 1150 may transmit the static metadata, the global metadata, and the local metadata described above with reference to FIGS. 1 through 10 together with the first image input from the input unit 1110 to the server. The communication unit 1150 may receive the first image and the second image from an external server.

Figure 12:
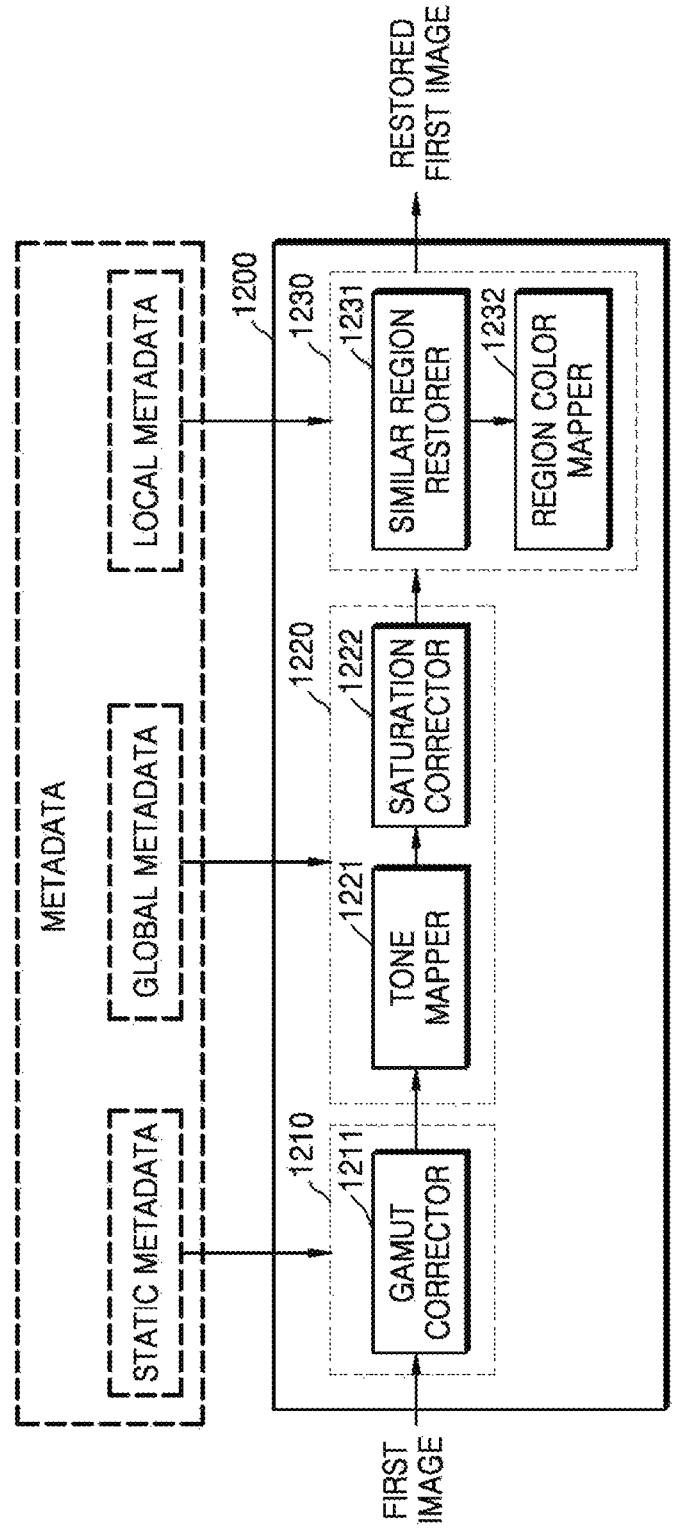
FIG. 12 illustrates a block diagram of an image processing apparatus.

FIG. 12 illustrates a block diagram of an image processing apparatus.

An image processing apparatus 1200 may include a static mapper 1210, a global mapper 1220, and a local mapper 1230. In addition, the image processing apparatus 1200 may receive metadata including at least one of the static metadata, the global metadata, and the local metadata and correct the first image based on the received metadata.

The static mapper 1210 may include a gamut corrector 1211. The gamut corrector 1211 may correct the color gamut of the first image based on gamut information of the second image, which is included in the static metadata. For example, the gamut corrector 1211 may correct the color gamut of the first image having a narrow gamut according to wide gamut information of the second image, which is included in the static metadata, or correct the color gamut of the first image having a wide gamut according to a narrow gamut of the second image, which is included in the static metadata. When a color gamut such as a white point and primary color coordinates is converted, hue of an image at same color coordinates may vary. Therefore, the image processing apparatus 1200 may prevent an error which may occur according to a difference in a color gamut by correcting the color gamut of the first image based on the color gamut of the second image before converting a dynamic range of the first image.

When the gamut information of the first image differs from the gamut information of the second image, the gamut corrector 1211 may correct the color gamut of the first image. Otherwise, when the gamut information of the first image is the same as the gamut information of the second image, the gamut corrector 1211 may omit gamut correction on the first image.

The gamut corrector 1211 may acquire the gamut information of the first image, which is included in the static metadata. However, when the static metadata does not include the gamut information of the first image, the gamut corrector 1211 may analyze the first image to directly acquire the gamut information of the first image. In addition, when the static metadata does not include the gamut information of the second image, the gamut corrector 1211 may correct the color gamut of the first image by using the gamut information of the second image, which is pre-stored in the image processing apparatus 1200.

The global mapper 1220 may include a tone mapper 1221 and a saturation corrector 1222. The tone mapper 1221 may perform tone mapping on the first image based on a tone mapping function included in the global metadata, and the saturation corrector 1222 may perform saturation correction on the first image based on a saturation correction function included in the global metadata. For example, the tone mapper 1221 may widen a dynamic range of the first image having the LDR or the SDR or narrow the dynamic range of the first image having the HDR, based on the tone mapping function included in the global metadata. The global mapper 1220 may perform more efficient tone mapping and saturation correction by using the first image of which the color gamut has matched the color gamut of the second image by the static mapper 1210.

The global mapper 1220 may perform tone mapping and saturation correction on the first image based on a scene-wise tone mapping function and a scene-wise saturation correction function included in the global metadata. The global metadata may be set to be scene-wise and may be applied to all frames included in one scene. Frames included in one scene may refer to the same tone mapping function and the same saturation correction function included in the global metadata, and frames included in different scenes may refer to different tone mapping functions and different saturation correction functions included in the metadata.

The local mapper 1230 may determine whether additional color mapping on a plurality of regions split from the first image has been performed. When an image producer performed specific color correction on a partial region of an image besides global mapping, the local mapper 1230 may acquire a color mapping function of a corresponding region of the first image from the local metadata.

In detail, the local mapper 1230 may include a similar region restorer 1231 and a region color mapper 1232. Operations of the similar region restorer 1231 and the region color mapper 1232 will be described below in detail with reference to FIGS. 13 and 14.

The local metadata may be set to be region-wise in one scene and may be applied to a corresponding region of all frames included in one scene. The same regions of frames included in one scene may refer to a same color mapping function in the local metadata, and different regions of the frames included in the one scene may refer to different color mapping functions in the local metadata.

Not all the components of the image processing apparatus 1200 shown in FIG. 12 are mandatory components. The image processing apparatus 1200 may be implemented by more or less components than the components shown in FIG. 12. For example, the image processing apparatus 1200 may include at least one processor capable of performing all operations of the static mapper 1210, the global mapper 1220, and the local mapper 1230. Alternatively, the image processing apparatus 1200 may include a plurality of processors corresponding to the static mapper 1210, the global mapper 1220, and the local mapper 1230, respectively.

Figure 13:
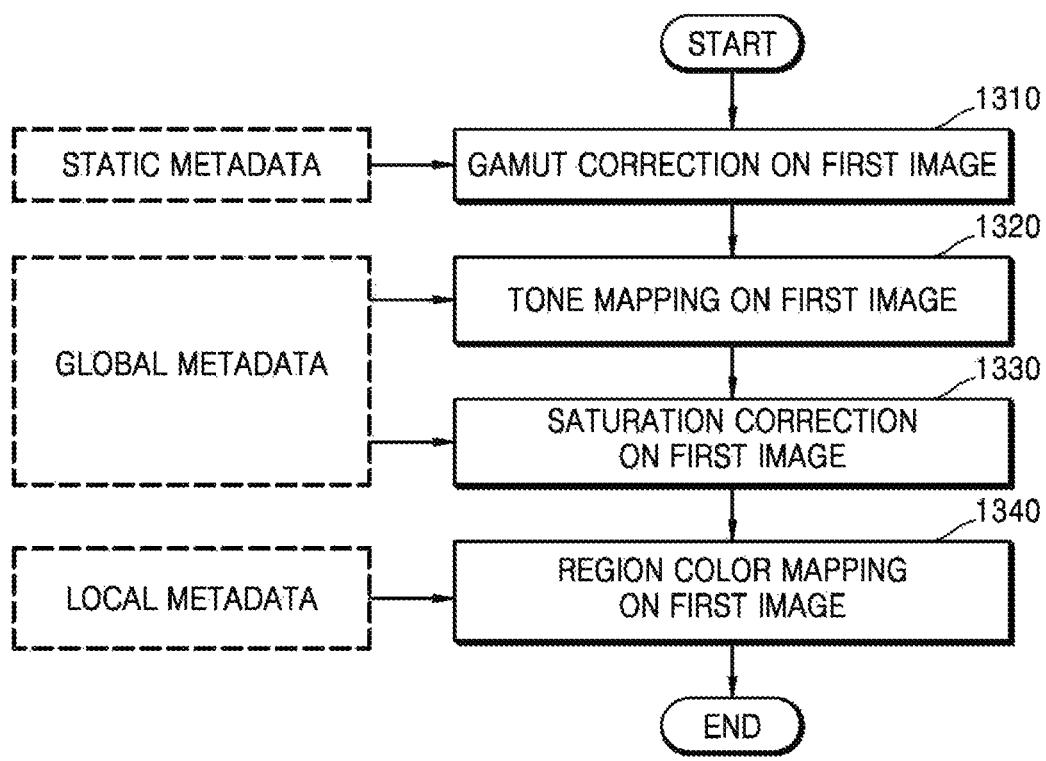
FIG. 13 illustrates a flowchart of an image mapping method.

FIG. 13 illustrates a flowchart of an image mapping method.

In operation 1310, the gamut corrector 1211 may correct the color gamut of the first image based on gamut information of the second image, which is included in the static metadata. When the gamut information of the first image matches the gamut information of the second image, the color gamut of the first image may be bypassed, and operation 1310 may be omitted.

In operation 1320, the tone mapper 1221 may perform tone mapping on the first image of which the color gamut has been corrected in operation 1310, based on a tone mapping function included in the global metadata. When a dynamic range of the first image matches a dynamic range of the second image, a luminance component of the first image may be bypassed, and operation 1320 may be omitted.

In operation 1330, the saturation corrector 1222 may perform saturation correction on the first image on which tone mapping has been performed in operation 1320, based on a saturation correction function included in the global metadata. When a saturation component of the first image matches a saturation component of the second image, the saturation component of the first image may be bypassed, and operation 1330 may be omitted.

In operation 1340, the local mapper 1230 may split the first image on which tone mapping has been performed in operation 1320 or the first image on which saturation correction has been additionally performed in operation 1330 into a plurality of regions based on the local metadata and perform color mapping on each region. When the color mapping on the regions split from the first image is not additionally performed, operation 1340 may be omitted.

Figure 14:
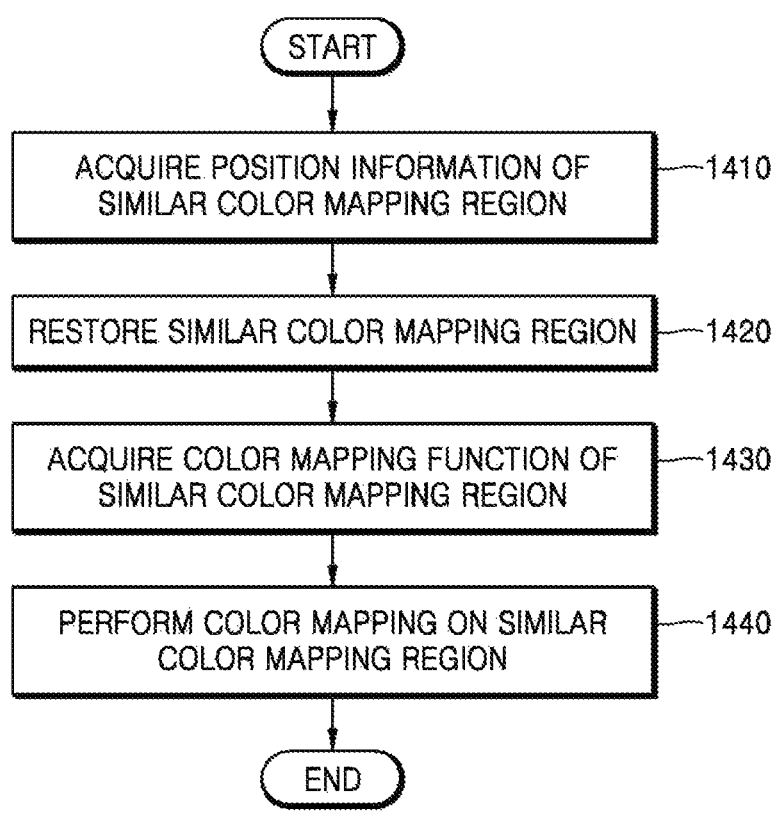
FIG. 14 illustrates a flowchart of region-wise color mapping.

FIG. 14 illustrates a flowchart of region-wise color mapping.

In operation 1410, the similar region restorer 1231 may acquire position information of a similar color mapping region, which is included in the local metadata. As described above with reference to FIGS. 9 and 10, the position information of the similar color mapping region may correspond to position information of a bounding box with respect to the similar color mapping region. For example, the local metadata may include an upper left corner coordinate (x, y) and a right lower corner coordinate (x, y) of the bounding box with respect to the similar color mapping region. As another example, the local metadata may include at least one coordinate (x, y) of the bounding box and size information of the bounding box with respect to the similar color mapping region. As another example, the local metadata may include a coordinate (x. y) located at a center of the bounding box, a half of a width of the bounding box, and a half of a height of the bounding box.

In operation 1420, the similar region restorer 1231 may restore the similar color mapping region from the first image based on the position information of the similar color mapping region, which has been acquired in operation 1410. The similar region restorer 1231 may restore the similar color mapping region from the first image on which gamut correction has been performed based on the static metadata including the gamut information of the second image and then tone mapping and saturation correction have been performed based on the global metadata including the tone mapping function and the saturation correction function between the second image and the gamut-corrected first image.

When the position information of the similar color mapping region corresponds to position information of a bounding box with respect to the similar color mapping region, the similar region restorer 1231 may first restore the bounding box and then restore the similar color mapping region.

For example, the bounding box may be restored as a rectangle connecting the upper left corner coordinate (x, y) and the lower right corner coordinate (x, y) of the bounding box, which are included in the local metadata. As another example, the bounding box may be restored based on one coordinate (x, y) located at a vertex of the bounding box (e.g., the upper left corner coordinate (x, y) or the lower right corner coordinate (x, y)), the width of the bounding box, and the height of the bounding box. As another example, the bounding box may be restored based on a coordinate (x, y) located at a center of the bounding box, a half of the width of the bounding box, and a half of the height of the bounding box.

The similar region restorer 1231 may restore the similar color mapping region from the first image based on spatial proximity and color similarity of pixels in the restored bounding box. That is, the similar color mapping region may be restored by removing unnecessary regions in the restored bounding box.

In operation 1430, the similar region restorer 1231 may acquire a color mapping function of the similar color mapping region, which is included in the local metadata. When additional color mapping on the similar color mapping region has not been performed, operation 1430 may be omitted.

In operation 1440, the region color mapper 1232 may perform color mapping on the similar color mapping region which has been restored in operation 1420, based on the color mapping function of the similar color mapping region, which has been acquired in operation 1430.

Figure 15:
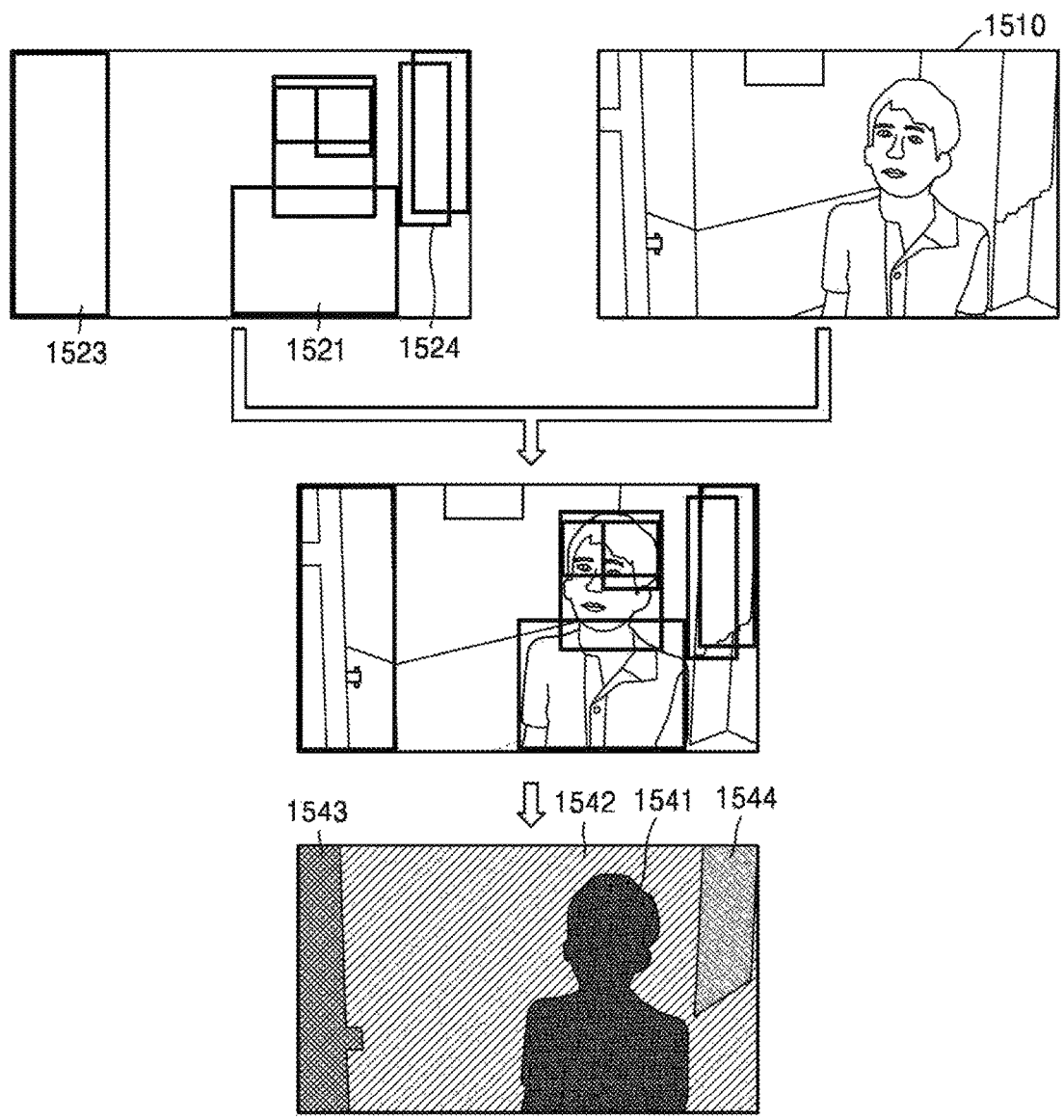
FIG. 15 illustrates an operation of restoring a similar color mapping region.

FIG. 15 illustrates an operation of restoring a similar color mapping region.

The similar region restorer 1231 may acquire position information and index information of bounding boxes 1521, 1523, and 1524 from local metadata. The index information of the bounding boxes 1521, 1523, and 1524 may indicate that the bounding boxes 1521, 1523, and 1524 correspond to which one of a plurality of similar color mapping regions 1541, 1542, 1543, and 1544 classified from a first image 1510. For example, the index information of the four bounding boxes 1521 corresponding to a first similar color mapping region 1541 may correspond to 1, the index information of the one bounding box 1523 corresponding to a third similar color mapping region 1543 may correspond to 3, and the index information of the two bounding boxes 1524 corresponding to a fourth similar color mapping region 1544 may correspond to 4. However, since additional color mapping on a wall that is a second similar color mapping region 1542 classified from the first image 1510 is not performed, a bounding box with respect to the second similar color mapping region 1542 may not be generated.

The similar region restorer 1231 may restore similar color mapping regions of the first image 1510 by combining bounding boxes corresponding to a same index among the bounding boxes 1521, 1523, and 1524. In detail, the similar region restorer 1231 may remove unnecessary regions in a bounding box based on spatial proximity and color similarity of pixels in the bounding box. In addition, the similar region restorer 1231 may restore the similar color mapping regions 1541, 1542, 1543, and 1544 of the first image 1510 by combining bounding boxes corresponding to a same index among bounding boxes from which unnecessary regions have been removed.

The similar color mapping regions 1541, 1542, 1543, and 1544 restored by the image processing apparatus 1200 from the first image 1510 based on local metadata may respectively correspond to the similar color mapping regions 941, 942, 943, and 944 split by the metadata generation apparatus 100 from the first image 910, which have been described above with reference to FIG. 9. The image processing apparatus 1200 may quickly and efficiently restore the similar color mapping regions 1541, 1542, 1543, and 1544 from the first image 1510 by using a small amount of local data received from the metadata generation apparatus 100.

The region color mapper 1232 may perform region-wise color mapping on the similar color mapping regions 1541, 1542, 1543, and 1544 split from the first image 1510, based on a region-wise color mapping function acquired from the local metadata and index information of the region-wise color mapping function Like the index information of the bounding boxes 1521, 1523, and 1524, the index information of the region-wise color mapping function may indicate that the region-wise color mapping function corresponds to which one of the plurality of similar color mapping regions 1541, 1542, 1543, and 1544 restored from the first image 1510.

Therefore, the region color mapper 1232 may perform region-wise color mapping on the similar color mapping regions 1541, 1542, 1543, and 1544 by matching the index information of the bounding boxes 1521, 1523, and 1524 with the index information of the region-wise color mapping function.

Figure 16:
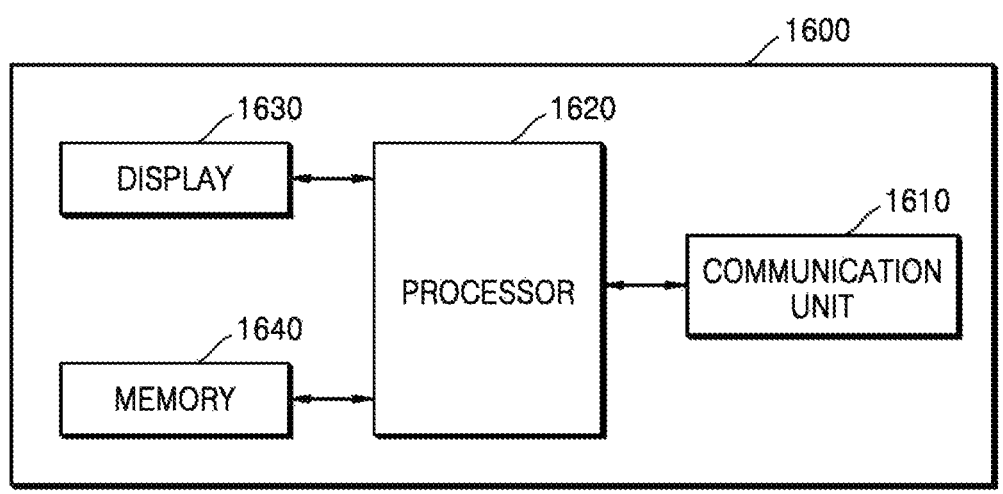
FIG. 16 illustrates a block diagram of an image decoding apparatus.

FIG. 16 illustrates a block diagram of an image decoding apparatus.

An image decoding apparatus 1600 may include a communication unit 1610, a controller 1620, a display 1630, and a memory 1640. Not all the components of the image decoding apparatus 1600 shown in FIG. 16 are mandatory components. The image decoding apparatus 1600 may be implemented by more or less components than the components shown in FIG. 12.

The communication unit 1610 may include one or more components enabling the image decoding apparatus 1600 to perform data communication with an external device or a server. For example, the communication unit 1610 may receive the static metadata, the global metadata, and the local metadata described above with reference to FIGS. 1 through 10 together with the first image.

The controller 1620 may include at least one processor and control an overall operation of the image decoding apparatus 1600. The controller 1620 may include the image processing apparatus 1200 described above with reference to FIGS. 11 through 15. For example, the controller 1620 may perform gamut correction, tone mapping, saturation correction, and region-wise color mapping on the first image based on metadata.

The display 1630 may display an input image or an output image of the image decoding apparatus 1600. For example, the display 1630 may display an original image of the first image and the first image on which the gamut correction, the tone mapping, the saturation correction, and the region-wise color mapping have been performed.

The memory 1640 may include at least one type of a storage medium among a flash memory type memory, a hard disk type memory, a multimedia card micro type memory, a card type memory (e.g., an SD or XD memory), RAM, SRAM, ROM, EEPROM, PROM, a magnetic memory, a magnetic disc, and an optical disc.

According to the metadata generation apparatus and method and the metadata-based image processing apparatus and method disclosed in the present application, an input image may be effectively corrected according to a mastering intention through gamut correction, tone mapping, saturation correction, and region-wise color mapping.

The methods described above may be written as computer-executable programs and may be implemented in general-use digital computers configured to execute the programs by using a computer-readable recording medium. In addition, a structure of data used in the methods may be recorded in a computer-readable recording medium in various ways. Examples of the computer-readable recording medium include storage media such as magnetic storage media (e.g., ROM, RAM, USB, floppy disks, hard disks, etc.) and optical recording media (e.g., CD-ROMs, or DVDs).

It will be understood by those of ordinary skill in the art that various changes in form and details may be made therein without departing from the spirit and scope of the disclosure described above. Therefore, the disclosed methods should be considered in a descriptive sense only and not for purposes of limitation. The scope of the present disclosure is defined not by the detailed description of the present disclosure but by the appended claims, and all differences within the scope will be construed as being included in the present disclosure.

The invention claimed is:

1. A metadata generation method comprising:
acquiring at least one of a tone mapping function and a saturation correction function between a first image and a second image based on pixels included in the first image and pixels included in the second image;
correcting the first image by performing the at least one of the tone mapping function and the saturation correction function on the first image;

generating global metadata including the at least one of the tone mapping function and the saturation correction function;

splitting the corrected first image into a plurality of regions based on spatial proximity and color similarity of pixels included in the corrected first image;

acquiring a color mapping function of a first region among the plurality of regions by comparing color information of pixels in the first region with color information of pixels in the second image, which correspond to the pixels in the first region;

acquiring a color mapping function of a second region among the plurality of regions by comparing color information of pixels in the second region with color information of pixels in the second image, which correspond to the pixels in the second region;

setting the first region and the second region as a similar color mapping region by comparing the color mapping function of the first region with the color mapping function of the second region;

acquiring a color mapping function of the similar color mapping region based on the color mapping function of the first region and the color mapping function of the second region; and generating local metadata including position information of the similar color mapping region in the corrected first image and the color mapping function of the similar color mapping region.

2. The metadata generation method of claim 1, wherein the corrected first image is split into a foreground region and a background region based on a background model learned in a time axis, and the plurality of regions are split from the foreground region and the background region.

3. The metadata generation method of claim 1, wherein the first region and the second region are spatially adjacent.

4. The metadata generation method of claim 3, further comprising:

acquiring a color mapping function of a third region, which is adjacent to the second region, among the plurality of regions by comparing color information of pixels in the third region with color information of pixels in the second image, which correspond to the pixels in the third region; and setting the first region through the third region as the similar color mapping region or setting the third region as a new similar color mapping region, by comparing the color mapping function of the similar color mapping region with the color mapping function of the third region.

5. The metadata generation method of claim 1, wherein the position information of the similar color mapping region comprises an upper left corner coordinate (x, y) and a right lower corner coordinate (x, y) of at least one bounding box with respect to the similar color mapping region.

6. The metadata generation method of claim 1, wherein the position information of the similar color mapping region comprises at least one coordinate (x, y) of a bounding box and size information of the bounding box with respect to the similar color mapping region.

7. The metadata generation method of claim 1, further comprising:

generating static metadata including gamut information of the second image; and correcting a color gamut of the first image based on the gamut information of the second image, wherein the acquiring of the at least one of the tone mapping function and the saturation correction function comprises:

acquiring the at least one of the tone mapping function and the saturation correction function based on pixels included in the gamut-corrected first image and pixels included in the second image.

8. The metadata generation method of claim 1, further comprising:

generating static metadata including gamut information of the second image; and correcting a color gamut of the first image based on the gamut information of the second image, wherein the acquiring of the at least one of the tone mapping function and the saturation correction function comprises:

acquiring a tone mapping function between the gamut-corrected first image and the second image based on a luminance value of pixels included in the gamut-corrected first image and a luminance value of pixels included in the second image, wherein the correcting of the first image by performing the at least one of the tone mapping function and the saturation correction function on the first image comprises:

performing tone mapping on the gamut-corrected first image based on the tone mapping function, wherein the global metadata includes the tone mapping function, and the plurality of regions are split from the tone-mapped first image.

9. The metadata generation method of claim 8, wherein the acquiring of the at least one of the tone mapping function and the saturation correction function further comprises:

acquiring a saturation correction function between the tone-mapped first image and the second image based on a saturation value of pixels included in the tone-mapped first image and a saturation value of the pixels included in the second image; and performing saturation correction on the tone-mapped first image based on the saturation correction function, wherein the global metadata further comprises the saturation correction function, and the plurality of regions are split from the saturation-corrected first image.

10. An image processing method comprising:

receiving global metadata including at least one of a tone mapping function and a saturation correction function between a first image and a second image;

correcting the first image by performing the at least one of the tone mapping function and the saturation correction function on the first image;

receiving local metadata including position information of a similar color mapping region in the corrected first image and a color mapping function of the similar color mapping region;

restoring the similar color mapping region in the corrected first image based on the position information of the similar color mapping region; and correcting color components of pixels in the restored similar color mapping region based on the color mapping function of the similar color mapping region.

11. The image processing method of claim 10, wherein the position information of the similar color mapping region comprises an upper left corner coordinate (x, y) and a right lower corner coordinate (x, y) of a bounding box with respect to the similar color mapping region.

12. The image processing method of claim 10, wherein the position information of the similar color mapping region comprises at least one coordinate (x, y) of a bounding box and size information of the bounding box with respect to the similar color mapping region.

13. The image processing method of claim 10, further comprising:
receiving static metadata including gamut information of the second image; and
correcting a color gamut of the first image based on the gamut information of the second image,
wherein the correcting of the first image comprises correcting the gamut-corrected first image by performing the at least one of the tone mapping function and the saturation correction function on the gamut-corrected first image.

14. The image processing method of claim 10, further comprising:
receiving static metadata including gamut information of the second image; and
correcting a color gamut of the first image based on the gamut information of the second image,
wherein the receiving of the global metadata comprises receiving the global metadata including the tone mapping function between the gamut-corrected first image and the second image,
wherein the correcting of the first image by performing the at least one of the tone mapping function and the saturation correction function comprise:
performing tone mapping on the gamut-corrected first image based on the tone mapping function, and
the similar color mapping region is restored from the tone-mapped first image.

15. The image processing method of claim 14, wherein the correcting of the first image by performing the at least one of the tone mapping function and the saturation correction function further comprises performing saturation correction on the tone-mapped first image based on a saturation correction function between the tone-mapped first image and the second image, which is included in the global metadata,
wherein the similar color mapping region is restored from the saturation-corrected first image.

16. An image decoding apparatus comprising:
a communicator configured to receive a first image, local metadata, and global metadata; and
a processor configured to:
receive global metadata including at least one of a tone mapping function and a saturation correction function between the first image and a second image,
correct the first image by performing the at least one of the tone mapping function and the saturation correction function on the first image,
receive the local metadata including position information of a similar color mapping region in the corrected first image and a color mapping function of the similar color mapping region,
restore the similar color mapping region in the corrected first image based on the position information of the similar color mapping region; and
correct color components of pixels in the restored similar color mapping region based on the color mapping function of the similar color mapping region.

17. The image decoding apparatus of claim 16, wherein the position information of the similar color mapping region comprises an upper left corner coordinate (x, y) and a right lower corner coordinate (x, y) of a bounding box with respect to the similar color mapping region.

18. The image decoding apparatus of claim 16, wherein the position information of the similar color mapping region comprises at least one coordinate (x, y) of a bounding box and size information of the bounding box with respect to the similar color mapping region.

19. The image decoding apparatus of claim 16, wherein the processor configured to correct a color gamut of the first image based on static metadata including gamut information of the second image, which has been received by the communicator, and correct the gamut-corrected first image by performing the at least one of the tone mapping function and the saturation correction function on the gamut-corrected first image.

20. The image decoding apparatus of claim 19, wherein the processor configured to perform tone mapping on the gamut-corrected first image based on global metadata including the tone mapping function between the gamut-corrected first image and the second image, which has been received by the communicator,
wherein the similar color mapping region is restored from the tone-mapped first image.

* * * * *